(12) United States Patent
Nada

(10) Patent No.: US 6,757,599 B2
(45) Date of Patent: Jun. 29, 2004

(54) OPERATION CONTROL APPARATUS AND OPERATION CONTROL METHOD WITH SECOND MODE OF CONTROL DURING DETECTOR ABNORMALITY

(75) Inventor: Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/379,719

(22) Filed: Mar. 6, 2003

(65) Prior Publication Data

US 2003/0158639 A1 Aug. 21, 2003

Related U.S. Application Data

(62) Division of application No. 09/852,039, filed on May 10, 2001, now Pat. No. 6,591,173.

(30) Foreign Application Priority Data

May 10, 2000 (JP) .................................... 2000-136957

(51) Int. Cl.[7] .......................... G06F 7/00; B60K 6/02
(52) U.S. Cl. ...................... 701/29; 701/34; 180/65.2; 180/65.8
(58) Field of Search .......................... 701/29, 34, 76, 701/92, 97, 22; 180/65.2, 65.3, 65.8

(56) References Cited

U.S. PATENT DOCUMENTS

| | | | | |
|---|---|---|---|---|
| 4,499,876 A | | 2/1985 | Yamamoto | |
| 5,388,562 A | * | 2/1995 | Sekiguchi et al. | 123/359 |
| 5,551,396 A | * | 9/1996 | Suzuki et al. | 123/399 |
| 5,697,466 A | * | 12/1997 | Moroto et al. | 180/65.2 |
| 5,950,597 A | * | 9/1999 | Kamio et al. | 123/397 |
| 5,964,811 A | * | 10/1999 | Ishii et al. | 123/479 |
| 6,178,947 B1 | * | 1/2001 | Machida et al. | 123/396 |
| 6,273,061 B1 | * | 8/2001 | Hosoi | 123/333 |
| 6,276,472 B1 | * | 8/2001 | Takashima et al. | 180/65.2 |
| 6,405,818 B1 | * | 6/2002 | Anthony et al. | 180/65.2 |
| 6,427,100 B1 | * | 7/2002 | Kaku et al. | 701/22 |

FOREIGN PATENT DOCUMENTS

| | | |
|---|---|---|
| JP | 63-97855 | 4/1988 |
| JP | 63-150440 | 6/1988 |
| JP | 64-24145 | 1/1989 |

* cited by examiner

*Primary Examiner*—Michael J. Zanelli
(74) *Attorney, Agent, or Firm*—Oblon, Spivak, McClelland, Maier & Neustadt, P.C.

(57) ABSTRACT

If an abnormality occurs in a vehicle, an abnormality detected-time control is performed in accordance with the kind of the abnormality. An output characteristic of the vehicle is selected in accordance with the kind of the abnormality, so that safety at the time of occurrence of an abnormality can be improved. When such output restriction is performed, the restriction is tightened stepwise. Therefore, safety at the time of occurrence of an abnormality is further improved.

22 Claims, 11 Drawing Sheets

OPERATION CONTROL APPARATUS AND OPERATION CONTROL METHOD WITH SECOND MODE OF CONTROL DURING DETECTOR ABNORMALITY

INCORPORATION BY REFERENCE

This application is a Division of application Ser. No. 09/852,039, filed on May 10, 2001, which is now U.S. Pat. No. 6,591,173.

BACKGROUND OF THE INVENTION

1. Field of the Invention

The present invention relates to an operation control apparatus and an operation control method. More particularly, the invention relates to an operation control apparatus installed in a vehicle for controlling the state of running of the vehicle and an operation control method for controlling the state of running of a vehicle.

2. Description of the Background

Normally, a drive power generating apparatus installed in a vehicle for generating drive power for the vehicle performs a control regarding generation of drive power while inputting detection signals from various sensors for detecting the state of operation of the vehicle, the state of driving of the power generation apparatus, etc. If an abnormality occurs to a sensor that outputs a detection signal, the power generating apparatus becomes unable to normally execute the control for generating drive power by using the detection signals.

For example, Japanese Patent Application Laid-Open No. SHO 64-24145 discloses an art related to the invention. In a method disclosed in the aforementioned patent application, a plurality of systems of sensors for detecting predetermined operation characteristic quantities regarding the vehicle are provided. If an abnormality occurs in a sensor, the detection signal from another sensor is used to drive the drive power generating apparatus, and furthermore, the output characteristic of the power generating apparatus is changed in order to cause a driver to feel the occurrence of an abnormality. For example, an air-fuel ratio control and an ignition timing control regarding a gasoline engine, that is, a drive power generating apparatus, are performed by using detection signals from an air flow sensor that detects the amount of intake air supplied into the engine. If the air flow sensor has an abnormality, the detection signal from a throttle sensor for detecting the degree of opening of a throttle valve is used instead of the detection signal from the air flow sensor, in order to perform the control. Furthermore, when the air flow sensor has an abnormality, the output characteristic of the engine is changed from the characteristic exhibited during a normal state, that is, the air-fuel ratio control and the ignition timing control are changed from those performed during the normal state, thereby causing a driver to actually feel the occurrence of a abnormality. This construction makes it possible to continue running the vehicle and to inform the driver of the occurrence of an abnormality.

However, even when a driver is thus caused to actually feel the occurrence of an abnormality, the driver may continue running the vehicle since a sufficient running performance is secured by the control that uses output signals from a sensor that is different from the sensor used during the normal state. The continuation of the running of the vehicle when a sensor regarding the control of the drive power generating apparatus, such as the engine or the like, has an abnormality, is not desirable in terms of safety because if another abnormality occurs in the vehicle, the vehicle is possible to fail to appropriately respond to the abnormality.

As a countermeasure taken when an abnormality is detected in a sensor regarding the drive control of the vehicle, it is conceivable to determine that a normal control is impossible and to prohibit the running of the vehicle. However, if an abnormality is detected during the running of the vehicle, prohibiting the running of the vehicle may make the vehicle fail to be controlled apporoprately.

SUMMARY OF THE INVENTION

Accordingly, it is an object of the invention to provide an operation control apparatus and an operation control method for securing sufficient safety of a vehicle even at the time of a specific kind of abnormality, such as an abnormality related to a control of a drive power generating apparatus.

Each of an operation control apparatus and an operation control method in accordance with a first mode of the invention is incorporated in a vehicle and, when controlling the state of running of the vehicle, controls a drive power generating apparatus so as to generate drive power in accordance with a request for an increase in the drive power to be outputted via an axle of the vehicle. When an abnormality of the vehicle is detected, the drive power generating apparatus is controlled in a during-abnormality control mode corresponding to the content of the abnormality.

According to the first mode of the invention, when a specific kind of abnormality is detected in the vehicle, a control mode corresponding to the kind of the detected abnormality is executed among a plurality of pre-set "during-abnormality" control modes. Therefore, even at the time of occurrence of an abnormality, a vehicle drive power is secured in accordance with the kind of the abnormality that has occurred.

The during-abnormality control mode is a control mode which restricts changes in the drive power in accordance with a drive power increasing request, in comparison with a state where the abnormality is not detected.

This construction reduces the accelerating performance of the vehicle at the time of occurrence of an abnormality, in comparison with a normal level. Therefore, it prevents excessive acceleration of the vehicle having an abnormality, and improves the safety of the vehicle running with an abnormality being present.

Furthermore, the during-abnormality control mode may prohibit the vehicle from accelerating regardless of the drive power increasing request, after the speed of the vehicle reaches a specific speed.

Therefore, at the time of occurrence of an abnormality, the vehicle speed does not exceed the aforementioned specific vehicle speed. Hence, this construction prevents undesired high-speed running of the vehicle having an abnormality, and improves the safety of the vehicle running with an abnormality being present.

Furthermore, the during-abnormality control mode may allow a drive power corresponding to the drive power increasing request to be generated until the speed of the vehicle reaches the specific speed, provided that the speed of the vehicle occurring when the abnormality is detected is at least a predetermined speed.

This construction improves safety at the time of an abnormality during high-speed running.

Furthermore, the during-abnormality control mode may allow the vehicle to run in accordance with the drive power increasing request up to a predetermined speed that is beyond the specific speed of the vehicle, provided that at least one of certain conditions is met, the conditions including an elapsed time following detection of the abnormality and a travel distance following detection of the abnormality.

Therefore, within a predetermined time or a predetermined travel distance following detection of an abnormality, the running of the vehicle that reflects a driver's intention can be performed up to the predetermined vehicle speed that is beyond the specific vehicle speed. Thus, a sufficient protective action can be taken.

Still further, the during-abnormality control mode may be a control mode of generating the drive power in the drive power generating apparatus by using a portion capable of being normally driven when the abnormality occurs, and of changing the drive power in accordance with the drive power increasing request.

This construction makes it possible to generate the drive power by using the portion capable of being normally driven, and to perform the running of the vehicle that reflects a driver's intention. Therefore, a best-possible drive power for a protective action can be secured, and safety at the time of occurrence of an abnormality can be improved.

Still further, the during-abnormality control mode may restrict the drive power of the vehicle stepwise based on at least one of an elapsed time following detection of the abnormality and a travel distance following detection of the abnormality.

This construction secures a further sufficient drive power until the predetermined time elapses following detection of an abnormality or until the vehicle runs the predetermined distance following detection of an abnormality. Therefore, a protective action can be easily taken, and the safety at the time of occurrence of an abnormality can be improved. Furthermore, by restricting the drive power of the vehicle in a stepwise fashion, the construction deters longer-than-necessary continuation of the running of the vehicle with an abnormality being present. Thus, safety of the vehicle can be improved.

Still further, a plurality of detectors that detect a specific quantity of displacement regarding the vehicle may be provided, and the abnormality corresponding to the during-abnormality control mode of restricting the drive power of the vehicle stepwise may be an abnormality that occurs in at least one of the detectors, so that if an abnormality occurs in at least another one of the detectors it is impossible to detect the abnormality.

Therefore, if the detected abnormality is an abnormality that occurs in at least one of the detectors for detecting the specific quantity of displacement regarding the vehicle so that if an abnormality occurs in at least another one of the detectors it is impossible to detect the abnormality, then the drive power of the vehicle is restricted stepwise. Hence, it becomes possible to substantially prevent an event that if an abnormality occurs in the other detectors, the driver continues driving the vehicle without being aware of the abnormality. Thus, safety of the vehicle can be improved.

Still further, the during-abnormality control mode may be a control mode of outputting a sufficiently small drive power that allows the vehicle to be moved via the drive power generating apparatus regardless of the driver's drive power increasing request.

This construction makes it possible to secure a drive power that is needed to move the vehicle. Even if, depending on the kind of abnormality, it becomes difficult to perform a control that reflects a driver's intention, the vehicle can be moved to a safe place. Thus, safety of the vehicle can be improved.

Each of an operation control apparatus and an operation control method in accordance with a second mode of the invention is incorporated in a vehicle and, when controlling the state of running of the vehicle, controls a drive power generating apparatus installed in the vehicle for generating a drive power of the vehicle, detects a specific kind of an abnormality in the vehicle and, after detecting an abnormality, restricts the drive power of the vehicle stepwise.

According to the second mode of the invention, the restriction of the drive power is performed stepwise after an abnormality is detected. Therefore, at the time of occurrence of an abnormality, a further sufficient drive power can be secured. Hence, a protective action can be taken more safely at the time of occurrence of an abnormality.

The operation control apparatus of the second mode may further include a plurality of detectors that detect a specific quantity of displacement regarding the vehicle, and the specific kind of abnormality may be an abnormality that occurs in at least one of the detectors so that if an abnormality occurs in at least another one of the detectors it is impossible to detect the abnormality.

Therefore, if the detected abnormality is an abnormality that occurs in at least one of the detectors for detecting the specific quantity of displacement regarding the vehicle so that if an abnormality occurs in at least another one of the detectors it is impossible to detect the abnormality, then the drive power of the vehicle is restricted stepwise. Hence, it becomes possible to substantially prevent an event that if an abnormality occurs in the other detectors, the driver continues driving the vehicle without being aware of the abnormality. Thus, safety of the vehicle can be improved.

Furthermore, the drive power may be restricted based on at least one of an elapsed time following detection of the abnormality and a travel distance following detection of the abnormality.

This construction secures a further sufficient drive power until the predetermined time elapses following detection of an abnormality or until the vehicle runs the predetermined distance following detection of an abnormality. Therefore, a protective action can be easily taken, and the safety at the time of occurrence of an abnormality can be improved.

The modes of the invention are not limited to the above-described operation control apparatus. Another mode of the invention is a vehicle equipped with an operation control apparatus in accordance with the invention. This vehicle achieves advantages as stated above, for example, advantages of securing a further sufficient drive power at the time of occurrence of an abnormality, and making it easier to take a protective action, and deterring longer-than-necessary continuation of the running of the vehicle with an abnormality being present, etc.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

To further clarify the above-described construction and operation of the invention, forms of carrying out the invention will be described with reference to preferred embodiments.

Figure 1:
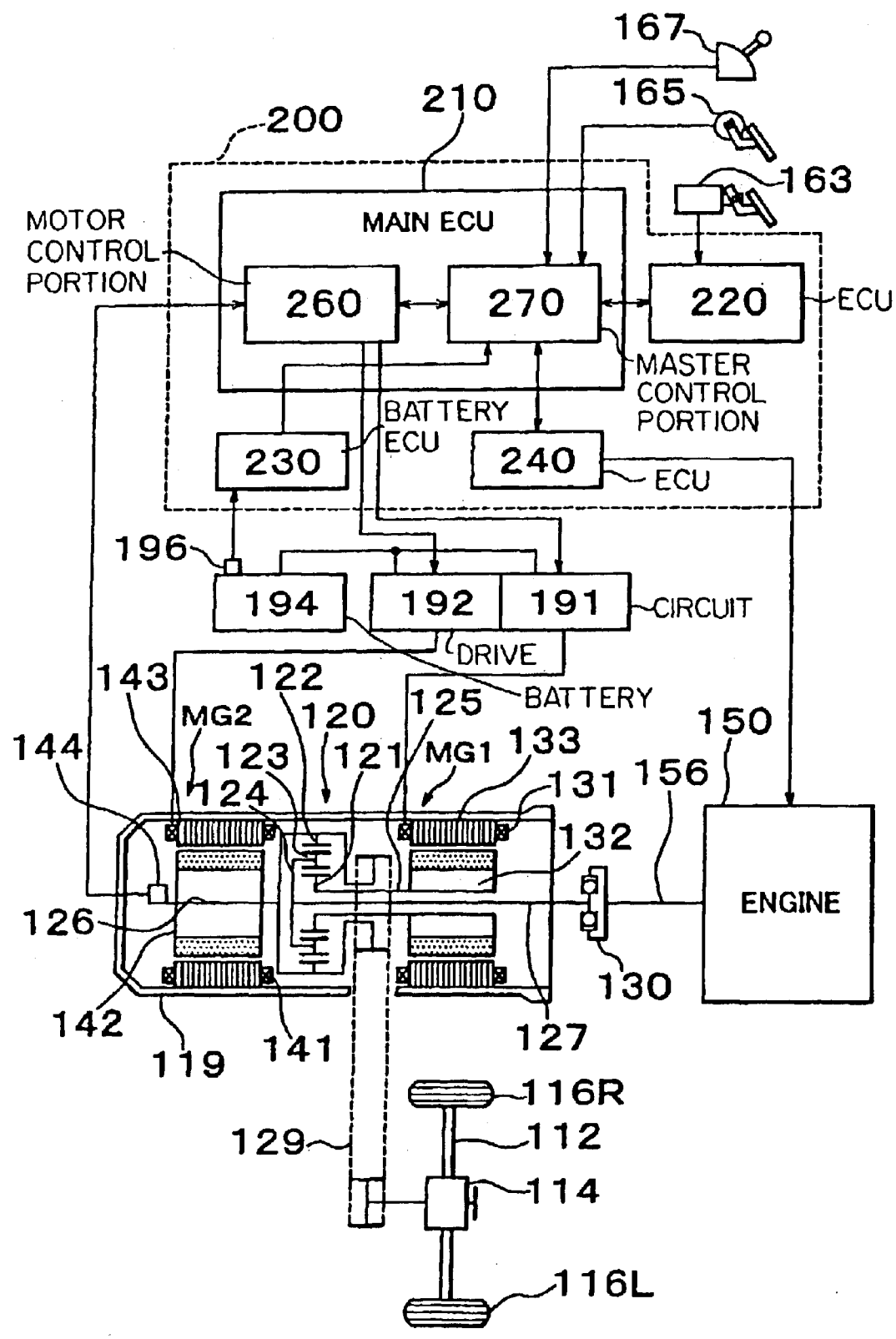
FIG. 1 is a diagram illustrating an overall construction of a hybrid vehicle in accordance with a first embodiment of the invention.

First, a construction of a hybrid vehicle as an embodiment of the invention will be described. FIG. 1 is a diagram illustrating an overall construction of the hybrid vehicle as an embodiment of the invention. The hybrid vehicle has three driving motors: an engine 150, and two motor-generators MG1, MG2. The term "motor-generator" means a driving motor that functions as both an electric motor (driving motor) and a generator (electric power generator), and will be simply termed "motor" hereinafter. The vehicle is controlled by a control system 200.

The control system 200 includes a main ECU 210, a brake ECU 220, a battery ECU 230, and an engine ECU 240. Each ECU is formed as one unit in which a microcomputer containing a CPU, a ROM, a RAM, etc., and a plurality of circuit elements including an input interface, an output interface, etc., are disposed on a circuit baseboard. In each ECU, the CPU executes various controls in accordance with programs recorded in the ROM. The main ECU 210 has a motor control portion 260 and a master control portion 270. The master control portion 270 has functions to determine quantities of control, such as distribution of the outputs of the engine 150 and the motors MG1, MG2, etc.

The engine 150 may be an ordinary gasoline engine, and turns a crankshaft 156. The operation of the engine 150 is controlled by the engine ECU 240. The engine ECU 240 controls the amount of fuel injection, and the like, regarding the engine 150, in accordance with commands of the master control portion 270.

Each of the motors MG1, MG2 is formed as a synchronous electric motor having a rotor 132, 142 carrying a plurality of permanent magnets on its outer peripheral surface, and a stator 133, 143 on which three-phase coils 131, 141 for creating rotating fields are formed. The stators 133, 143 of the motors MG1, MG2 are fixed to a case 119. The three-phase coils 131, 141 wound on the stators 133, 143 of the motors MG1, MG2 are connected to a secondary battery 194 via drive circuits 191, 192, respectively. Each of the drive circuits 191, 192 is a transistor-inverter that has a pair of transistors as switching elements for each phase. The drive circuits 191, 192 are controlled by the motor control portion 260. When transistors in the drive circuits 191, 192 are switched by control signals from the motor control portion 260, current flows between the secondary battery 194 and the motors MG1, MG2. The motors MG1, MG2 are able to operate as rotating electric motors (hereinafter, this state of operation will be referred to as "motoring state") when supplied with electric power. When the rotors 132, 142 are rotated by external force, the motors MG1, MG2 function as generators that produce electromotive force between ends of the three-phase coils 131, 141, and thereby charge the secondary battery 194 (hereinafter, this state of operation will be referred to as "regenerating state").

The rotating shafts of the engine 150 and the motors MG1, MG2 are mechanically interconnected via a planetary gear 120. The planetary gear 120 is made up of a sun gear 121, a ring gear 122, and a planetary carrier 124 having planetary pinion gears 123. In the hybrid vehicle of the embodiment, the crankshaft 156 of the engine 150 is connected to a planetary carrier shaft 127 via a damper 130. The damper 130 is provided for absorbing torsional vibrations that occur on the crankshaft 156. The rotor 132 of the motor MG1 is connected to a sun gear shaft 125. The rotor 142 of the motor MG2 is connected to a ring gear shaft 126. Rotation of the ring gear 122 is transferred to an axle 112 and wheels 116R, 116L via a chain belt 129 and a differential gear 114.

The control system 200 employs various sensors for realizing control of the entire vehicle. For example, the system 200 employs an accelerator sensor 165 for detecting the amount of depression of an accelerator pedal caused by the driver, a shift position sensor 167 for detecting the position of a shift lever, a brake sensor 163 for detecting the depressing pressure on a brake pedal, a battery sensor 196 for detecting the state of charge of the secondary battery 194, a rotation speed sensor 144 for measuring the rotation speed of the motor MG2, etc. Since the ring gear shaft 126 and the axle 112 are mechanically interconnected by the chain belt 129, the rotation speed ratio between the ring gear shaft 126 and the axle 112 is constant. Therefore, using the rotation speed sensor 144 provided on the ring gear shaft 126, the rotation speed of the axle 112 can be detected, as well as the rotation speed of the motor MG2.

Next described will be operations of the hybrid vehicle of the embodiment. To describe a basic operation of the hybrid vehicle, the operation of the planetary gear 120 will first be described. The planetary gear 120 has a characteristic that if rotation speeds of two of the three aforementioned rotating shafts are determined, the rotation speed of the other rotating shaft is also determined. The rotation speeds of the three rotating shafts have a relationship as expressed by equation (1).

$$Nc = Ns \times \rho/(1+\rho) + Nr \times 1/(1+\rho) \tag{1}$$

In equation (1), Nc is the rotation speed of the planetary carrier shaft 127; Ns is the rotation speed of the sun gear shaft 125; and Nr is the rotation speed of the ring gear shaft 126. Furthermore, $\rho$ is the gear ratio between sun gear 121 and the ring gear 122 expressed by the following equation:

$\rho$=[number of teeth of sun gear 121]/[number of teeth of ring gear 122]

The torques of the three rotating shafts have a relationship as given by equations (2) and (3), regardless of the rotation speeds thereof.

$$Ts = Tc \times \rho/(1+\rho) \qquad (2)$$

$$Tr = Tc \times 1/(1+\rho) = Ts/\rho \qquad (3)$$

In the equations, Tc is the torque of the planetary carrier shaft 127; Ts is the torque of the sun gear shaft 125; and Tr is the torque of the ring gear shaft 126.

The hybrid vehicle of the embodiment is able to run in various states due to the function of the planetary gear 120. For example, when the vehicle speed is relatively low after the hybrid vehicle starts running, drive power is transferred to the axle 112 by the motoring of the motor MG2 while the engine 150 is kept stopped. Similarly, the hybrid vehicle can run while maintaining an idling state of the engine 150.

When the hybrid vehicle, after starting to run, reaches a predetermined speed, the control system 200 starts the engine 150 by motoring it through the use of the torque outputted by motoring the motor MG1. At this moment, reaction torque of the motor MG1 is outputted to the ring gear 122 via the planetary gear 120 as well.

When the planetary carrier shaft 127 is rotated by operating the engine 150, the sun gear shaft 125 and the ring gear shaft 126 rotate under a condition that satisfies equations (1) to (3). The drive power based on rotation of the ring gear shaft 126 is transferred to the wheels 116R, 116L. The drive power based on rotation of the sun gear shaft 125 can be regenerated into electric power by the first motor MG1. If the second motor MG2 is motored, the motor MG2 outputs drive power to the wheels 116R, 116L via the ring gear shaft 126.

During a steady operation, the output of the engine 150 is set to a value that is substantially equal to a requested drive power of the axle 112 (i.e., torque×rotation speed of axle 112). In this case, a portion of the output of the engine 150 is transferred directly to the axle 112 via the ring gear shaft 126, and the remaining amount of the output is regenerated as electric power by the first motor MG1. The regenerated electric power is used for the second motor MG2 to produce torque for rotating the ring gear shaft 126. As a result, the axle 112 can be driven at a desired rotation speed and a desired torque.

If the torque transferred to the axle 112 is insufficient, the second motor MG2 is used to provide a torque assist. The electric power for the torque assist is a combination of electric power regenerated by the first motor MG1 and electric power stored in the battery 194. Thus, the control system 200 controls the operations of the two motors MG1, MG2 in accordance with the requested drive power that needs to be outputted via the axle 112.

The hybrid vehicle of the embodiment is also able to move backward while continuously operating the engine 150. When the engine 150 is operated, the planetary carrier shaft 127 rotates in the same direction as it rotates during the forward running of the vehicle. If during this state, the motor MG1 is controlled so as to rotate the sun gear shaft 125 at a higher rotation speed than the planetary carrier shaft 127, the ring gear shaft 126 reverses into the backward direction as can be understood from equation (1). The control system 200 is able to move the hybrid vehicle backward by operating the second motor MG2 in the backward direction and simultaneously controlling the output torque of the second motor MG2.

As for the planetary gear 120, it is possible to rotate the planetary carrier 124 and the sun gear 121 while the ring gear 122 is at a stop. Therefore, even when the vehicle is at a stop, the engine 150 can be operated. For example, if the remaining amount of charge of the secondary battery 194 becomes scarce, the secondary battery 194 can be charged by operating the engine 150 and thereby regeneratively operating the first motor MG1. If the first motor MG1 is motored during a stop of the vehicle, the torque produced by the first motor MG1 can be used to motor the engine 150 and thereby start the engine 150.

Figure 2:
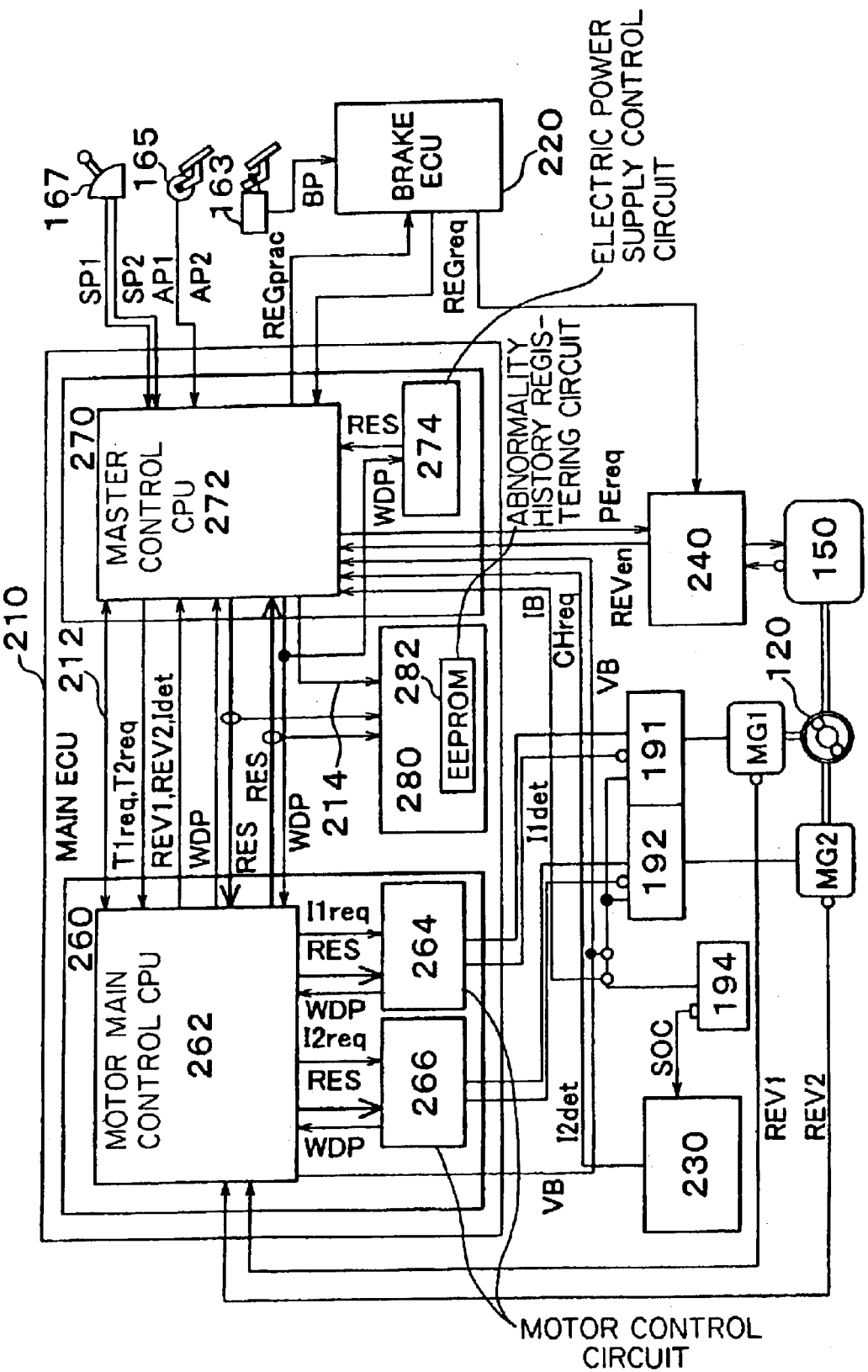
FIG. 2 is a block diagram illustrating a detailed construction of a control system 200.

FIG. 2 is a block diagram of a more detailed construction of the control system 200 of the embodiment. The master control portion 270 includes a master control CPU 272 and an electric power supply control circuit 274. The motor control portion 260 has a motor main control CPU 262, and two motor control CPUs 264, 266 for controlling the two motors MG1, MG2, respectively. Each CPU includes a CPU, a ROM, a RAM, an input port and an output port (which are not shown), thus forming a one-chip microcomputer.

The master control CPU 272 has functions to determine quantities of control, such as the distribution of the operation speeds and torques of the engine 150 and the motors MG1, MG2, and to supply various requested values to the other CPUs and ECUs, and to control the driving of each driving motor. For this control, the master control CPU 272 is supplied with accelerator position signals AP1, AP2 indicating the amount of operation of the accelerator, shift position signals SP1, SP2 indicating the shift position, the output voltage value VB of the battery 194, the output current value IB of the battery 194, the vehicle speed, etc. The accelerator sensor 165 and the shift position sensor 167 are each formed by two systems of sensors, and supply the two accelerator position signals AP1, AP2 and the two shift position signals SP1, SP2 to the motor main control CPU 262.

The electric power supply control circuit 274 is a circuit for transforming the high-voltage DC voltage of the battery 194 into a low-voltage DC voltage for each circuit of the main ECU 210. The electric power supply control circuit 274 also has a function as a monitor circuit for monitoring the master control CPU 272 for abnormalities.

The engine ECU 240 controls the engine 150 in accordance with a requested engine output value PEreq provided from the master control CPU 272. The engine ECU 240 feeds the revolution speed REVen of the engine 150 back to the master control CPU 272.

The motor main control CPU 262 supplies requested current values I1req, I2req to the two motor control CPUs 264, 266 in accordance with requested torque values T1req, T2req provided from the master control CPU 272 regarding the motors MG1, MG2. In accordance with the requested current values I1req, I2req, the motor control CPUs 264, 266 control the drive circuits 191, 192 to drive the motors MG1, MG2. The revolution speed sensors of the motors MG1, MG2 feed the revolution speeds REV1, REV2 of the motors MG1, MG2 back to the motor main control CPU 262. The motor main control CPU 262 feeds the revolution speeds REV1, REV2 of the motors MG1, MG2, as well as actually measured current values I1det, I2det (represented collectively as Idet in FIG. 2), that is, the values of current supplied from the battery 194 to the drive circuits 191, 192, etc. back to the master control CPU 272. Furthermore, the output voltage value VB of the battery 194 is also inputted to the motor main control CPU 262.

The battery ECU 230 monitors the state of charge SOC of the battery 194, and supplies a requested charge value CHreq of the battery 194 to the master control CPU 272 if necessary. Taking the requested value CHreq into account, the master control CPU 272 determines an output of each driving motor. That is, if the battery 194 needs to be charged, the engine 150 is caused to output a power that is greater than the output needed for the running of the vehicle, and a portion of the output of the engine 150 is distributed for the charging operation of the first motor MG1.

The brake ECU 220 performs a control of maintaining a balance between a hydraulic brake (not shown) and the regenerative brake effect provided by the motor MG2. The reason for performing this control is that during braking in the hybrid vehicle of the embodiment, the motor MG2 performs a regenerative operation, and therefore the battery 194 is charged. More specifically, the brake ECU 220 inputs a requested regeneration value REGreq into the master control CPU 272 based on the brake pressure BP from the brake sensor 163. The master control CPU 272 determines operations of the motors MG1, MG2 based on the requested regeneration value REGreq, and feeds a practiced regeneration value REGprac back to the brake ECU 220. The brake ECU 220 controls the amount of braking caused by the hydraulic brake to an appropriate value based on the brake pressure BP and the difference between the practiced regeneration value REGprac and the requested regeneration value REGreq.

Thus, the master control CPU 272 determines outputs of the engine 150 and the motors MG1, MG2, and supplies requested values to the engine ECU 240, the first motor control CPU 264, and the second motor control CPU 266 for controlling the engine 150, the first motor MG1, and the second motor MG2, respectively. In accordance with the requested values, the engine ECU 240, the first motor control CPU 264 and the second motor control CPU 266 control the respective driving motors. Therefore, the hybrid vehicle is able to run by outputting an appropriate drive power via the axle 112 in accordance with the running condition. Furthermore, during braking, the brake ECU 220 and the master control CPU 272 cooperate to control the operations of the hydraulic brake and the driving motors. Hence, it is possible to realize braking that does not cause much discomfort to the driver while regenerating electric power.

The four CPUs 272, 262, 264, 266 use generally-termed watchdog pulses WDP to monitor one another for abnormalities. If a CPU has an abnormality and its watchdog pulses stop, another CPU supplies a reset signal RES to the CPU having an abnormality, and thereby resets the CPU. The master control CPU 272 is also monitored for abnormalities by the electric power supply control circuit 274.

An abnormality history registering circuit 280 has an EEPROM 282 for registering the history of occurrence of abnormalities. In the EEPROM 282, the history of occurrence of abnormalities in various portions, such as the accelerator sensor 165, the shift position sensor 167, etc., is registered. Furthermore, reset signals RES1, RES2 sent and received between the master control CPU 272 and the motor main control CPU 262 are inputted to an input port of the abnormality history registering circuit 280. When reset signals RES1, RES2 are generated, the abnormality history registering circuit 280 stores the reset signals RES1, RES2 into the EEPROM 282 provided in the abnormality history registering circuit 280.

The master control CPU 272 and the abnormality history registering circuit 280 are able to give various requests and notifications to each other via a bidirectional communication line 214. Another bidirectional communication line 212 is provided between the master control CPU 272 and the motor main control CPU 262.

Next described will be an operation performed when an abnormality is detected in the hybrid vehicle of the embodiment. Examples of the abnormalities regarding generation of drive power in the hybrid vehicle of the embodiment include abnormalities of various portions regarding generation of drive power, such as the engine 150, the second motor MG2, the battery 194, etc., abnormalities in various sensors for detecting inputs that are made by a driver in order to control the state of running of the vehicle, abnormalities of the ECUs for controlling the states of operation of various portions, abnormalities regarding communications among the ECUs, etc.

The control performed when an abnormality as mentioned above occurs in the hybrid vehicle of the embodiment allows a protective action for avoiding dangers at the time of occurrence of an abnormality, so that a more sufficient running performance is secured in accordance with the kind of abnormality present, and long term running after an abnormality occurs is deterred by limiting the output.

In order to secure a running performance for allowing a protective action to be taken, the hybrid vehicle of the embodiment employs control methods for avoiding the use of a portion where an abnormality is detected, separately for expected abnormalities. More specifically, for a sensor abnormality, a control method for avoiding the use of the detection signal from the sensor where an abnormality is detected is set. For an abnormality in communications among ECUs, a control method for avoiding the use of information exchanged by inter-ECU communications where an abnormality is detected is set. Such control methods secure predetermined running performances even at the time of occurrence of abnormalities.

Thus, in the hybrid vehicle of the embodiment, control methods to be executed at the time of detection of an abnormality are set separately for the expected abnormalities. The ECUs, such as the engine ECU 240, the battery ECU 230, etc., store controls that are to be executed when an abnormality is detected in the engine 150, the battery 194, etc, which are controlled by their respective ECUs. The master control CPU 272 stores controls that are to be executed for various abnormalities. Therefore, when an abnormality is detected, an ECU changes the state of control in accordance with the kind of the abnormality, and executes a pre-stored control. When a specific kind of abnormality is detected in the vehicle, a control mode corresponding to the kind of the detected abnormality is executed. Therefore, it is possible to secure the vehicle driving power at the time of occurrence of an abnormality. Therefore, at the time of occurrence of an abnormality that has less effect on drive power generation performed by a drive power generating apparatus, excessive restriction of vehicle drive power is avoided, and causing the driver to feel a reduction in operability is considerably avoided.

Furthermore, since at the time of occurrence of an abnormality, a drive power is secured in accordance with the kind of the abnormality, the safety at the time of taking a protective action when an abnormality occurs can be improved. Specific operations for individual abnormalities will be described later.

Figure 3:
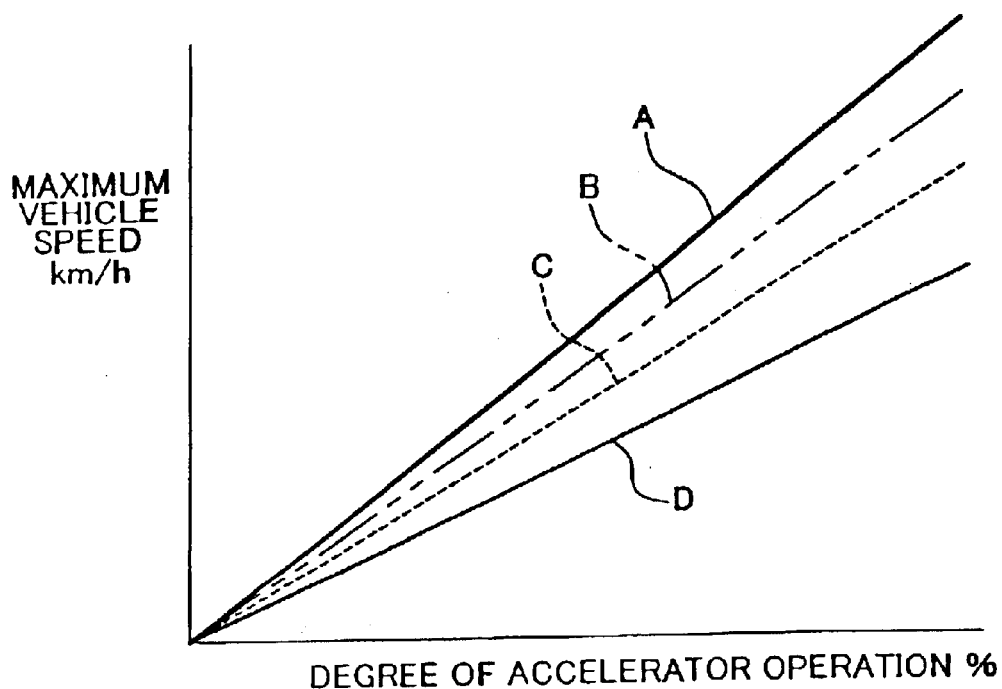
FIG. 3 is a diagram conceptually indicating the output characteristics of various controls performed at the times of occurrence of various abnormalities.

In the hybrid vehicle of the embodiment, the state of abnormality control pre-set for each expected abnormality and, in particular, the magnitude of drive power that can be outputted at the time of occurrence of the abnormality are set in accordance with the danger expected from the detected abnormality and in accordance with whether there is a danger of the abnormality causing another abnormality. FIG. 3 is a conceptual diagram indicating output characteristics of the vehicle exhibited during execution of controls pre-set corresponding to various abnormalities. In FIG. 3, the horizontal axis represents the degree of accelerator pedal depression, and the vertical axis represents the maximum vehicle speed. When no abnormality is detected in the hybrid vehicle, the hybrid vehicle exhibits an output characteristic indicated by (A) in FIG. 3. When an abnormality is detected, a control corresponding to the detected abnormality is executed, and one of output characteristics (B) to (D) is exhibited (depending on the kind of the detected abnormality, the output characteristic (A) is possible as described below). Actual output restriction is accomplished in accordance with the kind of a detected abnormality (a drive control method selected at the time of an abnormality), for example, by limiting the maximum vehicle speed, or retarding the responsiveness to torque request from the driver. As a result, the output is limited to various extents as indicated by the lines (B) to (D) in FIG. 3, so that a depression of an accelerator pedal (an increase in the torque request) does not increase the vehicle speed so much as during normal operation (normality). That is, since the acceleration performance and the vehicle speed are reduced at the time of an abnormality in comparison with those during normality, it is possible to prevent undesired acceleration or undesired high-speed running of the vehicle with an abnormality, and therefore it is possible to improve the safety of the vehicle during the running with an abnormality. Furthermore, the restriction on the acceleration performance and the vehicle speed allows the driver to perceive the occurrence of an abnormality, and therefore deters the driver from continuing to drive with an abnormality being present, and prompts the driver to take a safer protective action.

As indicated in FIG. 3, the output characteristics during controls executed at the time of detection of abnormalities are limited in comparison with the output characteristic during normality. However, FIG. 3 is a conceptual diagram indicating degrees of running performance during controls executed upon occurrence of abnormalities, and does not mean that when an abnormality is detected, an output restriction as indicated in FIG. 3 is forcibly executed. That is, during controls in response to some kinds of abnormalities, an output restriction is provided to reduce the running performance whereas during controls performed in response to other kinds of abnormalities, no particular output restriction is provided since the controls inevitably reduce the running performance (output) in comparison with normality. Although FIG. 3 indicates relationships of the maximum vehicle speed to the degree of accelerator pedal depression in order to conceptually illustrate the output characteristics at the time of various abnormalities, substantially the same characteristics are exhibited if the maximum vehicle speed on the vertical axis is replaced with the drive force (torque) that can be outputted via the axles or the amount of change in the torque. In controls actually executed at the time of abnormalities, the relationship of the actual output power (maximum vehicle speed or torque) with respect to the driver's request for an increased drive power (the degree of accelerator pedal depression) does not always need to be linear. However, maintaining such a linear correlation when the output is curbed at the time of an abnormality as well makes it possible to secure a certain level of acceleration performance in accordance with the driver's request while maintaining a responsiveness similar to that during normality, and therefore is desirable. That is, even when the acceleration is reduced at the time of occurrence of an abnormality, an acceleration perceivable by the driver in response to the driver's accelerator pedal operation can be achieved, and an event that a user unnecessarily feels danger at the time of an abnormality can be avoided, and a running performance for a protective action can be secured.

For example, in a case where an abnormality detected is an abnormality that does not impede the driving of one of apparatuses of the vehicle that are related to the drive power generation (the engine 150, the motors MG1, MG2, and the battery 194), and where it is possible to execute a control in which a drive power substantially the same as that during normality is outputted, and where continuing driving the vehicle may cause another abnormality (for example, in the case of an abnormality in one of two accelerator sensor systems), a control of restricting the output is executed in accordance with the expected abnormality, so as to achieve an output characteristic as indicated by lines (B) or (D) in FIG. 3. The control of restricting the output may be executed by, for example, setting a maximum vehicle speed, or curbing the performance of each aforementioned drive power generating apparatus to or below a predetermined proportion relative to the performance during normality.

Furthermore, if the control executed at the time of a predetermined abnormality is a control that involves a stop or restriction of the use of any one of the apparatuses related to generation of drive power and that inevitably involves a reduction of the output drive power in comparison with the level of output drive power during normality (e.g., if a control that does not use the battery 194 must be performed due to an abnormality in the battery 194 or the battery ECU 230 or the like), there is a case in which the control sufficiently restricts the output in accordance with whether there is a danger of the present abnormality causing another abnormality as indicated by the lines (B) to (D) in FIG. 3. In such a case, it is unnecessary to provide a further output restriction. In this case, a control causing a sufficiently restricted output in comparison with normality is performed by using an available drive power generating apparatus and, within its performance range, securing a running performance that reflects the driver's intention regarding increase/decrease of the drive power in a manner as close to a normal manner as possible.

At the time of occurrence of an abnormality, it is determined whether there is a danger of the present abnormality causing another abnormality. With regard to the output characteristic by a control executed at the time of occurrence of an abnormality, as indicated by lines (B) to (D), it is desirable to secure a running performance within an allowable range by reducing the output characteristic to various degrees in comparison with normality when it is determined that the abormality may cause another abnormality (by executing a control that inevitably achieves a sufficient output reduction, depending on the kind of abnormality). In the hybrid vehicle of the embodiment, an abnormality of the current sensor of the motor MG2 may be cited as an example of an abnormality during which the output should preferably be slightly restricted in comparison with normality as indicated by the line (B) in FIG. 3. Furthermore, as indicated by the line (C) in FIG. 3, examples of the abnormalities during which the output should be restricted include a voltage signal abnormality of the battery 194, an abnormality of an accelerator sensor (one of the two systems), an abnormality of the battery ECU 230, an abnormality in communications between the master control portion 270 and the battery ECU 230, etc.

Furthermore, cited as an abnormality that has a greater possibility of the abnormality causing another abnormality than the aforementioned abnormalities so that the output should be further restricted as indicated by the line (D) in FIG. 3 may be, for example, an abnormality that requires the vehicle running by the electric motor to be selected (an abnormality of the engine 150 or the engine ECU 240), or the like. Although the output characteristic indicated by the line (A) in FIG. 3 corresponds to normality, a control that allows an output characteristic substantially the same as that exhibited during normality may be performed depending on the kind of abnormality that has occurred. In this embodiment, if due to an abnormality of the shift position sensor 167, at least one of shift positions can not be recognized, a control is performed in which determination of the shift position is allowed only with respect to the positions that are normally detectable, and at the normally detectable shift positions, drive power can be outputted in a fashion similar to that during normality as indicated by the line (A) in FIG. 3.

Thus, if an abnormality occurs, the hybrid vehicle of the embodiment secures a running performance of the vehicle with a reduced output in accordance with the kind of the abnormality. Depending on the kind of the abnormality that has occurred, there is a danger of the abnormality causing another abnormality, that is, a possibility that a continued run of the vehicle may cause a predetermined danger. Conversely, depending on the kind of the abnormality that has occurred, it is possible to secure a sufficient safety while allowing a certain running performance of the vehicle, and a case can be conceived in which a sharp reduction of the running performance (restriction of the output) upon detection of an abnormality during running has a greater danger. By securing a certain running performance in accordance with the kind of a detected abnormality as in the embodiment, instead of prohibiting the running of the vehicle immediately after detection of the occurrence of the abnormality regardless of the kind or degree of the abnormality, it becomes possible to sufficiently avoid a danger that might be caused by the abnormality, and to take a protective action more safely if an abnormality occurs. In particular, the hybrid vehicle of the embodiment has, as apparatuses for generating power for driving the vehicle, the engine 150 as well as the motors MG1, MG2 and the battery 194 for driving the motors MG1, MG2. Therefore, if any one of the drive power generating apparatuses has an abnormality, a certain running performance can be secured by using a normal function.

Furthermore, according to the hybrid vehicle of the embodiment, if the vehicle speed is at least a predetermined value in a case where the control executed upon detection of a predetermined abnormality is a control that restricts the output although a greater drive power can be outputted, the vehicle running performance is not reduced immediately after the detection of the abnormality, but running at a sufficient vehicle speed (or a certain accelerating performance) is secured until a predetermined distance is traveled after the detection of the abnormality. This makes it possible to further improve the safety when an abnormality is detected during high-speed running. That is, if an output control is performed immediately after occurrence of an abnormality during high speed running, the vehicle speed sharply drops, so that there is a danger that drivers of vehicles traveling around the vehicle may have uneasy feelings. Furthermore, in that case, there is a great difference between the actually outputted drive power and the drive power intended by the driver, so that the driver may be alerted more than necessary. Therefore, if an abnormality is detected at the time of the vehicle speed being at least a predetermined value, a vehicle speed and an accelerating performance that reflect the driver's intention are secured until the vehicle speed reaches a predetermined vehicle speed that is beyond a specific vehicle speed, so that within that period, a protective action can be performed from a high-speed running state. If the vehicle speed at the time of detection of an abnormality is sufficiently low (including a case where the vehicle is stopped), it is desirable to immediately restrict the output to a sufficient degree so as to secure safety at the time of occurrence of an abnormality. This construction will be described in detail below in conjunction with a control regarding the maximum vehicle speed that is executed at the time of an accelerator sensor abnormality.

Furthermore, the hybrid vehicle of the embodiment gradually increases the restriction on the output and thereby curbs the output of the vehicle, besides allowing the running of the vehicle with the output being restricted in comparison with normality in accordance with the kind of abnormality as described above. That is, if an abnormality is detected, an operation control is performed with a predetermined output restriction as indicated in FIG. 3 in accordance with the kind of abnormality. For some kinds of abnormalities, a control of increasing the degree of output restriction stepwise in accordance with the time after detection of an abnormality, the travel distance after detection of an abnormality, etc. is further performed. Alternatively, if an abnormality is detected, a control of increasing the degree of output restriction stepwise in accordance with the time after detection of an abnormality, the travel distance after detection of an abnormality, etc. while allowing the vehicle to run by the output in accordance with the then running state, such as the vehicle speed or the like, is further performed, so that an operation control is performed with a predetermined output restriction being imposed as indicated in FIG. 3 in accordance with the kind of abnormality. The control of increasing the degree of output restriction can be accomplished by, for example, setting the maximum vehicle speed to a reduced value, or controlling a drive power generating apparatus so as to further reduce the degree of responsiveness to the torque request from the driver.

With this construction, the embodiment secures, immediately after occurrence of an abnormality, a certain output in accordance with the kind of the abnormality. Therefore, the embodiment achieves the following advantages, in addition to the aforementioned advantage of allowing a protective action to be performed safely. That is, since the restriction on the output gradually increases, the embodiment substantially deters the running of the vehicle from continuing longer than necessary after occurrence of an abnormality, and prompts the driver to repair the abnormality. Therefore, the embodiment can deter the driver from continuing to drive the vehicle for a long period after occurrence of an abnormality, and can improve safety after occurrence of an abnormality. In particular, if the kind of abnormality detected is a kind of abnormality that may cause another abnormality if the vehicle continues running, it is desirable to adopt a construction in which the aforementioned control of increasing the output restriction stepwise is performed so as to deter long term running of the vehicle after occurrence of an abnormality.

As for an output restricting method performed at the time of occurrence of an abnormality, a control of setting the magnitude of power outputted via the drive axle of the vehicle to a sufficiently small predetermined constant value (or range) is possible as well. For example, in the case of an abnormality that does not allow a control of inputting a torque request from the driver, and of accordingly driving the drive power generating apparatus, and of outputting via the axle a predetermined drive power corresponding to the torque request, it is impossible to output a drive power that reflects the driver's intention. However, if a control of constantly outputting a sufficiently small predetermined drive power via the axle is performed at the time of detection of an abnormality as mentioned above, the driver can move the vehicle to a safer location. The sufficiently small predetermined drive power to be outputted via the axle may be set to, for example, a drive power corresponding to a creep motion of an automatic-transmission vehicle. Although the hybrid vehicle of the embodiment is different from the automatic-transmission vehicle, the hybrid vehicle is able to output the aforementioned predetermined drive power via the axle by, for example, driving the motor MG2 through the use of electric power from the battery 194. Alternatively, the aforementioned sufficiently small drive power corresponding to the creep motion may be continuously outputted by driving the engine 150 and operating the first motor MG1 for regeneration (causing the motor MgS0 output a reaction torque opposing the torque transferred from the engine 150) and thereby causing the torque directly transferred from the engine 150 to the motor MG2 to be outputted via the axle. Cited as an abnormality that triggers performance of the above-described control may be, for example, an accelerator sensor abnormality described below (where the sensors of both systems fail).

According to the hybrid vehicle of the embodiment, when an abnormality is detected, the control of restricting the output is performed, so that the driver can detect occurrence of an abnormality by feeling a reduction in the accelerating performance or the like. In order to allow the driver to recognize occurrence of an abnormality more quickly and more clearly, the hybrid vehicle of the embodiment outputs a display or alarm alerting occurrence of an abnormality in a predetermined display portion readily visible to the driver, when an abnormality is detected.

However, if such a display is outputted, there is a danger that the driver, while driving the vehicle, may not be aware of the display. Therefore, in order to inform the driver of the occurrence of an abnormality as quickly as possible and thereby prompt the driver to take a predetermined protective action to secure safety, the hybrid vehicle of the embodiment has a construction in which, at the time of detection of an abnormality, an alarm sound is produced to indicate the abnormality, or vibrations are artificially generated so that the driver can know occurrence of the abnormality by physical feeling.

In the hybrid vehicle of the embodiment, continuously variable transmission is realized by controlling the power generation performed by the motor MG2. Therefore, through a switching control in the drive circuit 191 (for example, by performing a control of adding a noise to a target torque in conjunction with the motor MG2), smooth control of continuously variable transmission can be stopped, and desired vibrations can be easily generated in the vehicle during running. It is desirable that the vibrations thus produced be set to a level that does not cause the driver to feel a danger but is sufficient to make the driver feel the vibrations as an abnormal state.

The output restriction performed at the time of abnormalities as mentioned above will be described with reference to specific operations performed individually at the time of representative abnormalities.

First, an operation performed at the time of an accelerator sensor abnormality will be described.

Figure 4:
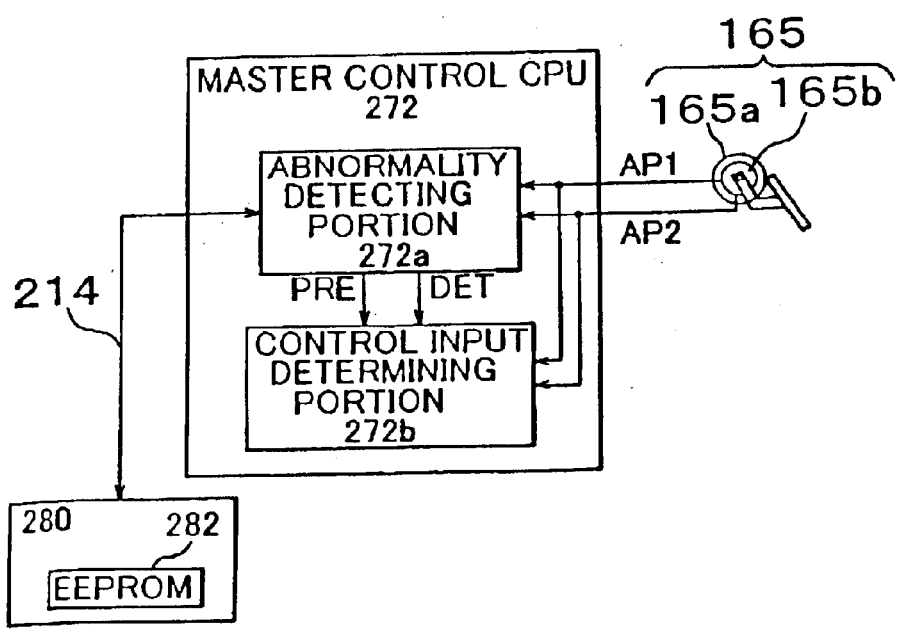
FIG. 4 is a block diagram illustrating a circuit construction related to the processing of an accelerator sensor output signal.

The accelerator sensor 165 provided on the accelerator pedal for detecting the degree of accelerator pedal depression is made up of the sensors of the two systems, and supplies two accelerator position signals AP1, AP2 to the master control CPU 272, as mentioned above. FIG. 4 is a block diagram illustrating a circuit construction related to the processing of output signals of the accelerator sensor 165. The accelerator sensor 165 is formed by two sensors 165*a*, 165*b* that have different characteristics. The sensors 165*a*, 165*b* may be, for example, potentiometers. The output signals AP1, AP2 of the two sensors 165*a*, 165*b* are inputted to the master control CPU 272.

The master control CPU 272 has a function as an abnormality detecting portion 272*a*, and a function as a control input determining portion 272*b*. The abnormality detecting portion 272*a* detects whether the accelerator sensor 165 has an abnormality. The control input determining portion 272*b* usually determines a control input (degree of accelerator pedal depression) from normal sensor outputs. However, when an abnormality occurs in one of the sensors, the control input determining portion 272*b* changes its operation to determining a control input through the use of an output of the sensor that is not abnormal. The functions of the portions 272*a*, 272*b* are realized by the master control CPU 272 executing programs stored in a ROM (not shown).

Figure 5A:
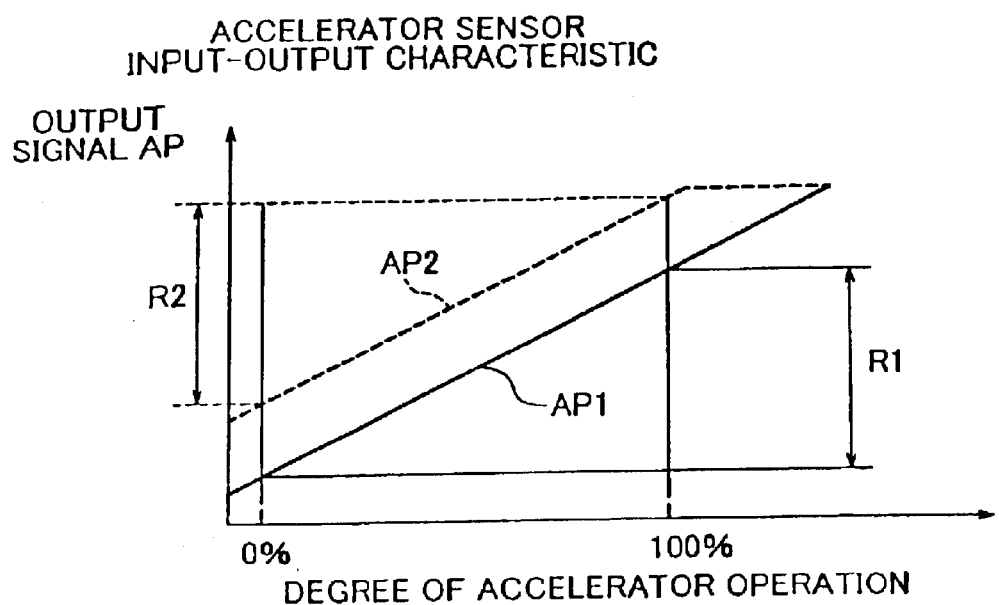
FIGS. 5A and 5B are graphs indicating characteristics of two sensors of the accelerator sensor 165.

FIG. 5A is a graph indicating an input-output characteristic of the accelerator sensor 165, where the horizontal axis represents the amount of depression of the accelerator pedal, and the vertical axis represents the level of the accelerator position signal. In this embodiment, the output signals AP1, AP2 from the two sensors 165*a*, 165*b* have equal gradients, but have different offsets. It is also possible to set the gradients of the two output signals AP1, AP2 to different values. The normal output ranges R1, R2 of the two sensors are set to ranges in which each of the relationships between the outputs AP1, AP2 of the two sensors and the degree of accelerator operation (amount of depression of the accelerator pedal) is singularly determined. In the example indicated in FIG. 5, the normal output ranges R1, R2 are set to ranges in which the relationships between the outputs AP1, AP2 of the two sensors and the degree of accelerator operation are indicated by straight lines.

Figure 5B:
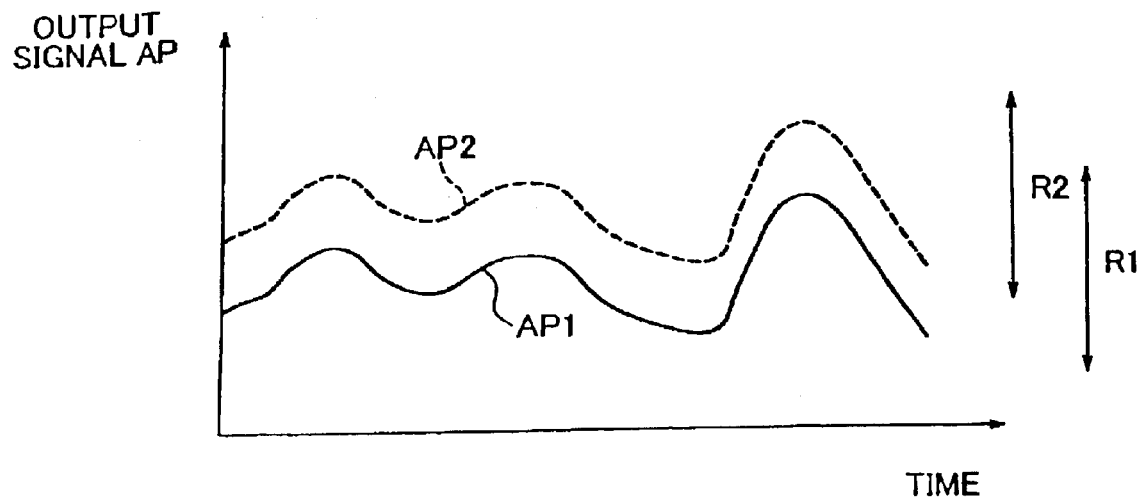

FIG. 5B indicates an example of the changing of the accelerator position signal occurring when both sensors operate normally. In this embodiment, when both sensors operate normally, the control input determining portion 272*b* (FIG. 4) determines a control input (degree of accelerator operation) from the first output signal AP1. It is also practicable to determine a degree of accelerator operation from the second output signal AP2.

The abnormality detecting portion 272*a* (FIG. 2) detects whether the two accelerator sensors 165*a*, 165*b* have an abnormality. In this embodiment, the abnormality detecting portion 272*a* detects a sensor abnormality based on whether the timewise change patterns of the sensor output signals AP1, AP2 correspond any of a plurality of pre-set abnormal patterns. The pre-set abnormal event patterns are stored in a ROM (not shown) for the master control CPU 272. Examples of the detection signal patterns pre-set for detecting a sensor abnormality are indicated in FIGS. 6 to 10.

Figure 6:
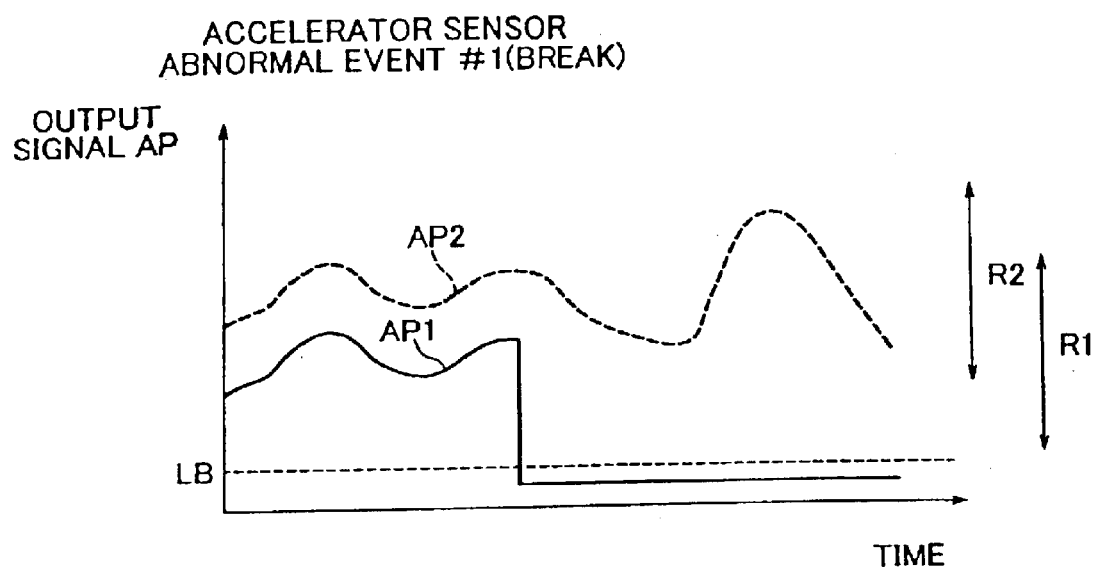
FIG. 6 is a diagram illustrating an abnormal event #1 of the accelerator sensor.

FIG. 6 indicates changes in the output signals occurring when the first accelerator sensor 165*a* has an abnormal event #1 (break of a sensor grounding wire). If the grounding wire of the first accelerator sensor 165*a* breaks, the output signal AP1 sharply drops below a predetermined breaking level LB, that is, outside the normal output range R1. If the detection signal exhibits this pattern, it is determined that the abnormal event #1 has occurred in the sensor.

Figure 7:
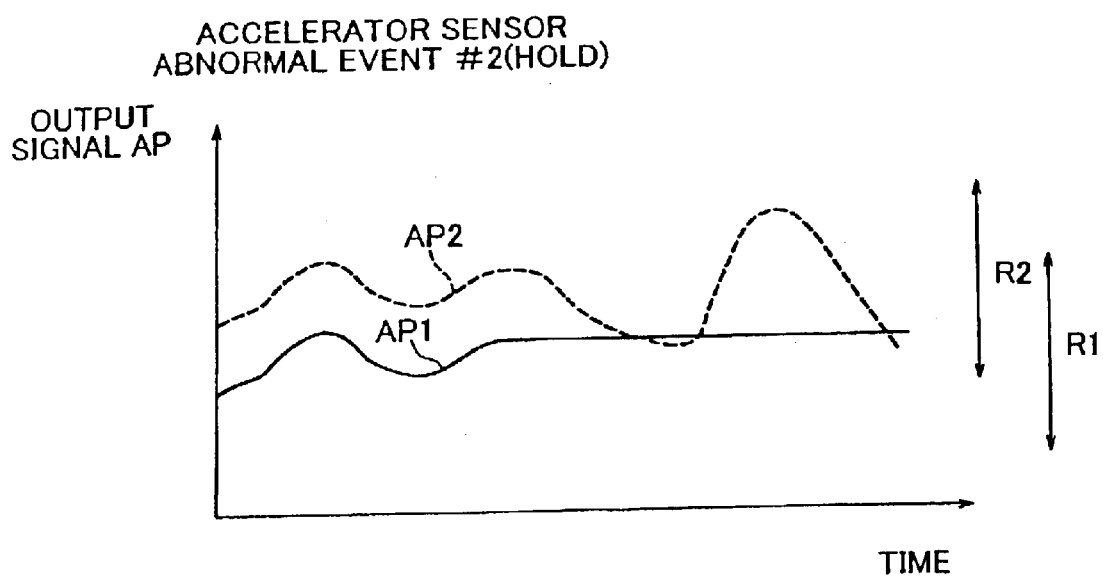
FIG. 7 is a diagram illustrating an abnormal event #2 of the accelerator sensor.

FIG. 7 indicates changes in the output signals occurring when the first accelerator sensor 165*a* has an abnormal event

2 (hold). The "hold" means that the output signal remains at a fixed value. When an accelerator sensor operates normally, it is very difficult for the driver to hold the accelerator pedal at a position so that the output signal of the sensor remains at a fixed value. Therefore, if the output signal of an accelerator sensor remains at a fixed value, it is determined that the sensor has an abnormality.

Figure 8:
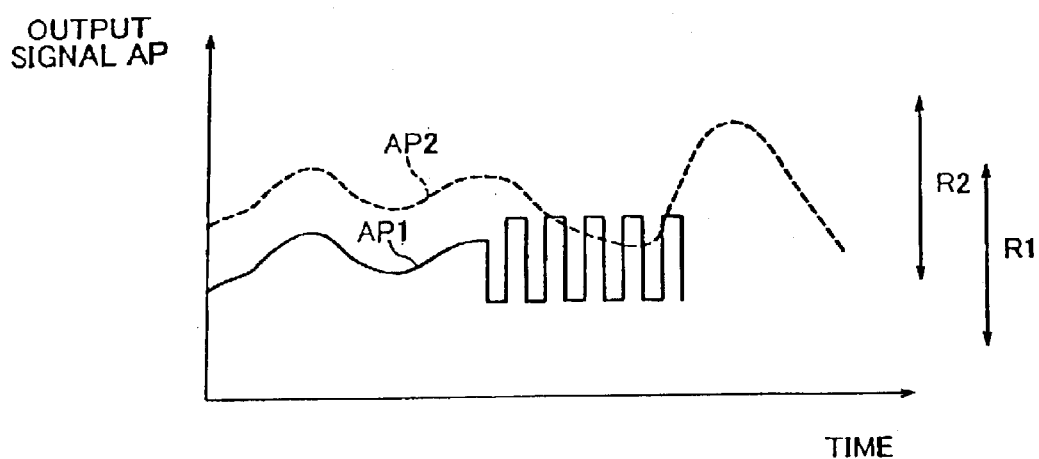
FIG. 8 is a diagram illustrating an abnormal event #3 of the accelerator sensor.

FIG. 8 indicates changes in the output signals occurring when the first accelerator sensor 165a has an abnormal event #3 (rectangular wave-like vibrations). When an accelerator sensor operates normally, it is very difficult for the driver to depress the accelerator pedal so that the output signal of the sensor changes in a rectangular wave pattern. Therefore, if the output signal of an accelerator sensor changes in a rectangular wave pattern, it is determined that the sensor has an abnormality.

Figure 9:
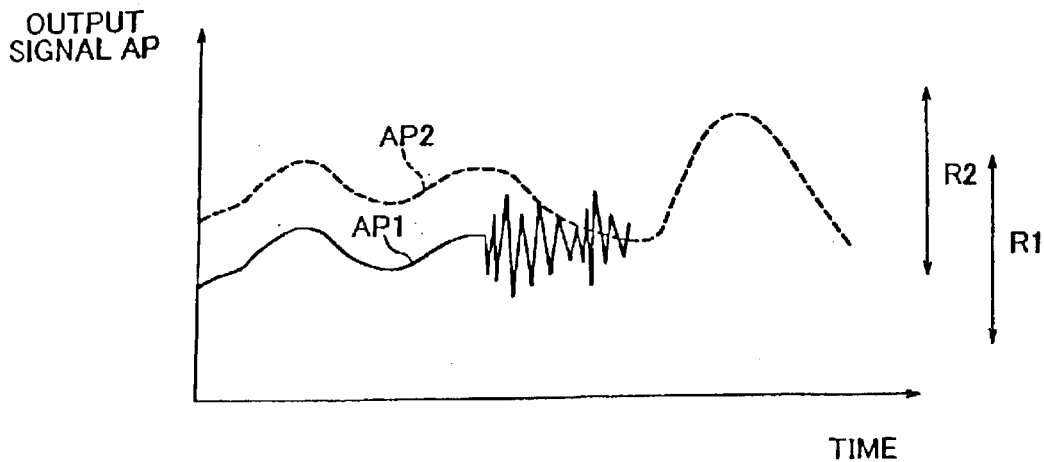
FIG. 9 is a diagram illustrating an abnormal event #4 of the accelerator sensor.

FIG. 9 indicates changes in the output signals occurring when the first accelerator sensor 165a has an abnormal event #4 (irregular vibrations). When an accelerator sensor operates normally, it is very difficult for the driver to depress the accelerator pedal so that the output signal of the sensor sharply changes in an irregular wave pattern. Therefore, if the output signal of an accelerator sensor changes in an irregular wave pattern, it is determined that the sensor has an abnormality.

Figure 10:
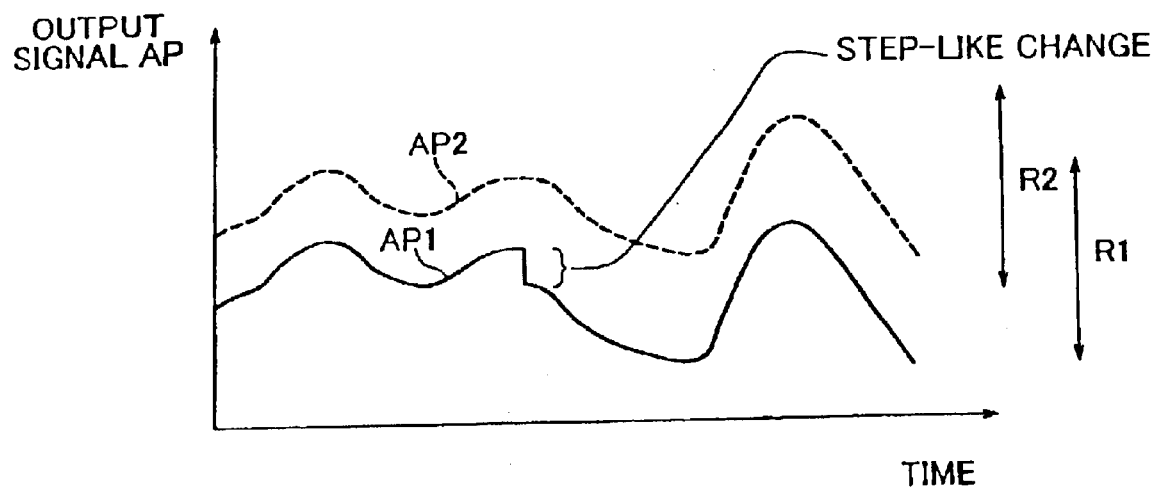
FIG. 10 is a diagram illustrating an abnormal event #5 of the accelerator sensor.

FIG. 10 indicates changes in the output signals occurring when the two accelerator sensors 165a, 165b have an abnormal event #4 (difference abnormality). When each accelerator sensor operates normally, the difference between the two output signals AP1, AP2 remains within a substantially constant appropriate range. For example, if the gradients of the two input-output characteristic lines in FIG. 5A are equal, the difference between the two output signals AP1, AP2 is substantially constant. Therefore, if the difference between the two output signals AP1, AP2 deviates from a constant appropriate range, it is determined that one of the sensors has an abnormality. If the abnormal event #5 occurs, the output signal AP1 changes so that the difference between the two output signals reaches a predetermined threshold, the abnormality detecting portion 272a determines that one of the sensors 165a, 165b has an abnormality. At this moment, for example, it can be determined that a sensor that exhibits a greater output change at a time point t0 at which the abnormality occurs in the difference (the sensor 165a in the example of FIG. 10) is abnormal.

Figure 11:
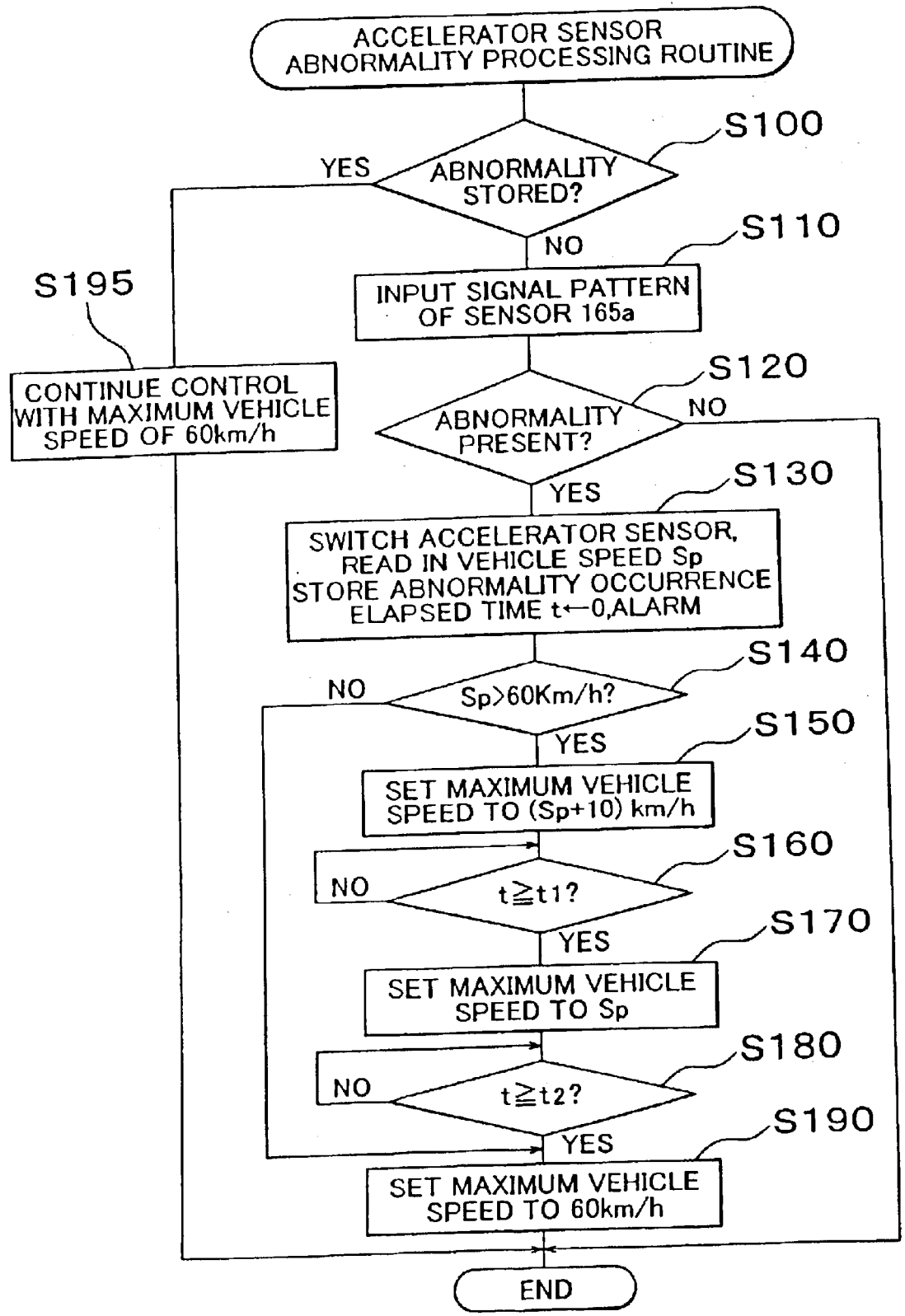
FIG. 11 is a flowchart illustrating an accelerator sensor abnormality processing routine.

FIG. 11 is a flowchart illustrating an accelerator sensor abnormality processing routine executed by the hybrid vehicle of the embodiment. This routine is executed by the master control CPU 272 at every predetermined time. Although an abnormality of either one of the two sensors 165a, 165b of the accelerator sensor 165 can be detected, an operation of detecting an abnormality of the sensor 165a and changing the control so that the sensor 165b is used will be described below, since in the hybrid vehicle of the embodiment, a control input (degree of accelerator operation) is usually determined from the first output signal AP1.

When the routine is executed, the master control CPU 272 first refers to the EEPROM 282 provided in the abnormality history registering circuit 280 (FIG. 4), and determines whether there is a history of occurrence of accelerator sensor abnormalities (step S100). If an accelerator sensor abnormality is detected, the master control CPU 272 registers information regarding which one of the sensors has an abnormality and what the abnormality is, in the EEPROM 282 provided in the abnormality history registering circuit 280 (FIG. 4), as described below. Therefore, by referring to the EEPROM 282 in the abnormality history registering circuit 280, the master control CPU 272 can recognize whether an accelerator sensor abnormality has occurred already. Alternatively, it is practicable to store occurrence of an abnormality in a ROM (not shown) provided for the master control CPU 272 separately from the EEPROM 282 of the abnormality history registering circuit 280 and to refer to the ROM.

If occurrence of an abnormality is not stored in the EEPROM 282 of the abnormality history registering circuit 280, the master control CPU 272 inputs the pattern of a signal outputted from the accelerator sensor 165a (step S110), and determines whether the sensor 165a has an abnormality based on whether the signal pattern is equivalent to any of the pre-stored abnormal patterns as described above (step S120).

If an abnormality of the sensor 165a is detected in step S120, the master control CPU 272 switches the signal for use when the control input determining portion 272b determines a degree of accelerator operation, from the signal AP1 from the sensor 165a to the signal AP2 from the sensor 165b. Furthermore, the master control CPU 272 reads in the vehicle speed Sp occurring at the time of detection of the abnormality, and stores the occurrence of the abnormality of the sensor 165a, together with the kind of the abnormality, into the EEPROM 282 of the abnormality history registering circuit 280. Still further, the master control CPU 272 substitutes a value "0" in the elapsed time t following the occurrence of the abnormality, and starts counting the elapsed time, and outputs an alarm, such as a display, a sound/voice, artificially generated vibrations, etc., in order to inform the driver of the occurrence of the abnormality (the aforementioned operations performed in step S130).

The vehicle speed Sp can be acquired based on the revolutions speed REV2 of the motor MG2. As for the registration of an abnormality, the abnormality detecting portion 272a registers information regarding which one of the sensors (the sensor 165a in this case) has what abnormality, into the EEPROM 282 (FIG. 4) of the abnormality history registering circuit 280. Since an abnormality history is registered in the EEPROM 282 in this manner, it becomes possible to know what abnormalities occurred during the running of the vehicle by connecting a service computer to the control system 200, reading the abnormality history from the EEPROM 282 and examining the history.

After that, the master control CPU 272 determines whether the acquired vehicle speed Sp is greater than a predetermined value (60 km/h in this embodiment) (step S140). If the vehicle speed Sp is greater than the predetermined value, the maximum vehicle speed that the vehicle can achieve is set to (Sp+10) km/h. If the accelerator pedal is kept depressed so that a further torque is requested, the master control CPU 272 performs a control of allowing the usual acceleration until the vehicle speed reaches the maximum vehicle speed. That is, after the vehicle speed reaches the maximum vehicle speed, the master control CPU 272 performs a control of prohibiting acceleration (step S150).

This control with the set maximum vehicle speed is continued until the elapsed time t following the occurrence of the abnormality reaches a pre-set predetermined time t1 (step S160). When the elapsed time t reaches the predetermined time t1, the master control CPU 272 changes the set value of the maximum vehicle speed from (Sp+10) km/h to Sp (step S170). That is, when the predetermined time t1 elapses following the occurrence of an abnormality, the master control CPU 272 changes the maximum vehicle speed allowed for the vehicle to a reduced setting.

The control with the reduced maximum vehicle speed being set is continued (step S180) until the elapsed time t following the occurrence of the abnormality reaches a pre-set predetermined time t2 (where t2>t1). When the elapsed time t reaches the predetermined time t2, the master control CPU 272 changes the maximum vehicle speed from Sp to 60 km/h (step S190), and then ends the routine. That is, when the predetermined time t2 elapses following the occurrence of the abnormality, the master control CPU 272 changes the maximum vehicle speed allowed for the vehicle to a further reduced setting.

If it is determined in step S140 that the vehicle speed Sp is not greater than 60 km/h, the master control CPU 272 immediately goes to step S190, in which the master control CPU 272 performs a control of limiting the vehicle speed by setting the maximum vehicle speed to 60 km/h. If it is determined in step S100 that the EEPROM 282 of the abnormality history registering circuit 280 stores a registered abnormality occurrence history, it means that the control of limiting the maximum vehicle speed to 60 km/h is being performed, and therefore the master control CPU 272 continues the control with the maximum vehicle speed being set to 60 km/h (step S195), and then ends the routine. If an abnormality of the sensor 165a is not detected in step S120, the master control CPU 272 immediately ends the routine.

According to this construction, if an abnormality occurs in one of the accelerator sensors, the control of limiting the maximum vehicle speed to a predetermined value (60 km/h in this embodiment) is performed. Therefore, it is possible to deter the driver from continuing driving longer than necessary while securing a certain running performance of the vehicle. Hence, the safety in driving the vehicle can be improved. Furthermore, as for the setting of a maximum vehicle speed, the hybrid vehicle of the embodiment has a construction in which if the vehicle speed at the time of occurrence of an abnormality is greater than a predetermined value, the vehicle is allowed to run at a vehicle speed greater than the maximum vehicle speed limit that is to be set when the vehicle speed is lower than the aforementioned predetermined value, and the vehicle speed restriction is tightened stepwise. Therefore, the safety during high-speed running can be improved. That is, if during high-speed running, the vehicle is forcibly decelerated by sharply limiting the vehicle speed simultaneously with detection of an abnormality, there is a danger of unnecessarily causing the driver to have an insecure feeling and of unnecessarily causing the drivers of vehicles traveling around the vehicle concerned to have an insecure feeling. According to this embodiment, if an accelerator sensor abnormality occurs during high-speed running, the drive power generating apparatus is driven by using the output signal of the remaining normal accelerator sensor and a sufficient running performance (a certain accelerating performance) is secured within a limited length of time. Therefore, it is possible to take protective action more safely from a high-speed running state.

The hybrid vehicle of the embodiment secures a certain running performance while performing an output restriction as indicated in FIG. 3 in accordance with the kind of the abnormality that has occurred, as described above. Since the aforementioned accelerator sensor abnormality is not an abnormality that directly impairs the drive power outputting operation of the drive power generating apparatus, the output is forcibly restricted by setting a maximum vehicle speed when one of the accelerator sensors has an abnormality.

The aforementioned abnormality that occurs in one of the accelerator sensors is regarded as an abnormality that has a relatively high degree of danger (a great danger of causing another abnormality), among the abnormalities that occur in a vehicle, and therefore, a degree of output restriction is set as indicated by the output characteristic line (C) in FIG. 3. This is because the abnormalities expected to occur in the remaining normal sensor if the vehicle continues to run using the remaining sensor includes abnormalities that cannot be detected. That is, as indicated in FIGS. 6 to 10, various abnormal patterns detected regarding an accelerator sensor are conceivable. An abnormality detected based on a relative difference between the output signals from the two sensors, such as the abnormal event #5 (difference abnormality) indicated in FIG. 10, may be considered. That is, if after such an abnormality occurs in one of the sensors a similar abnormality occurs in the other sensor, the abnormality of the other sensor cannot be detected. Therefore, if an abnormality occurs in one of the two systems of accelerator sensors, a vehicle safety is secured by imposing a sufficient output restriction, taking into account the possibility of occurrence of an undetectable abnormality. The maximum vehicle speed set for output restriction is not limited to the value (60 km/h) mentioned above in conjunction with the embodiment, but may be set to any suitable value within a range that meets the aforementioned circumstances.

Furthermore, with regard to the output restriction by setting a maximum vehicle speed after detection of an abnormality according to the embodiment, if the vehicle speed at the time of detection of an abnormality is at least the predetermined value, the vehicle is allowed to run at a higher speed only within the predetermined time following the occurrence of the abnormality. The reference vehicle speed used in this operation is not limited to the value set in the embodiment, but may be set to any suitable value. The time following an abnormality detection during which an increased maximum vehicle speed setting is allowed may be suitably set so that sufficient safety during high-speed running can be secured (a sufficient protective action can be taken). Furthermore, according to the foregoing embodiment, if the vehicle speed at the time of occurrence of an abnormality is at least the predetermined value and therefore the increased maximum vehicle speed is set, the maximum vehicle speed setting is gradually reduced stepwise as time elapses. The maximum vehicle speed set in the aforementioned situation (the detected vehicle speed Sp+10 km/h in the embodiment), and the amounts of reduction in the maximum vehicle speed setting may be suitably selected in accordance with the expected vehicle running conditions or the like, within a range that meets the requirement of securing safety during high-speed running.

According to the embodiment, if the vehicle speed at the time of an abnormality detection is not higher than the predetermined value (60 km/h), the maximum vehicle speed is limited to the predetermined value (60 km/h) immediately after the occurrence of the abnormality. If the vehicle speed at the time of occurrence of an abnormality is higher than the aforementioned predetermined value (60 km/h) and the maximum vehicle speed is set to the increased value, the maximum vehicle speed is then set to lower values stepwise, and is finally set to the aforementioned predetermined value (60 km/h) (see FIG. 11). However, it is also practicable to further reduce the maximum vehicle speed setting stepwise after the vehicle speed is set to the aforementioned predetermined value (60 km/h), in order to more strongly deter longer-than-necessary continuation of the running of the vehicle after occurrence of an abnormality. This construction makes it possible to substantially prevent the continued running of the vehicle after a sensor abnormality detection, where an abnormality in the other sensor is undetectable. Furthermore, although in the foregoing embodiment, the maximum vehicle speed is finally set to the same predetermined value (60 km/h) regardless of the vehicle speed at the time of occurrence of an abnormality, the final maximum vehicle speed setting may be varied depending on the state of running of the vehicle. For example, if the vehicle is at a stop when an abnormality occurs, the maximum vehicle speed may be set to a reduced final value from the beginning.

Furthermore, although in the foregoing embodiment, the maximum vehicle speed setting is gradually reduced with elapsed time following an abnormality occurrence, it is also practicable to use a different reference, such as the travel distance following an abnormality occurrence, or the like, as a basis for tightening the output restriction. Provided that a running performance sufficient to allow a certain protective action is secured at the time of occurrence of an abnormality and that output restriction is performed stepwise so as to deter the driver from continuing to drive after the abnormality occurrence, substantially the same advantages as stated above can be achieved.

Although the control performed at the time of occurrence of an abnormality in one of the two accelerator sensor systems is described above in conjunction with the foregoing embodiment, occurrence of abnormalities in both accelerator sensors is also conceivable. A control performed at the time of occurrence of abnormalities in both accelerator sensors will be described below.

The determination as to whether an accelerator sensor abnormality has occurred is made on the basis of the patterns of the output signal of each sensor (see FIGS. 6 to 10) as described above regarding the sensor 165a in the foregoing embodiment. If the two accelerator sensor systems both become abnormal, it becomes impossible to input an instruction regarding the drive power request from the driver. Therefore, the control of accelerating the vehicle in accordance with the degree of accelerator operation cannot be performed. To solve this problem, the hybrid vehicle of the embodiment has a construction in which if the two accelerator sensor systems both become abnormal, a sufficiently small predetermined drive power is outputted via the axle so as to allow the vehicle to move.

More specifically, if it is detected that both accelerator sensors are abnormal, a constant drive power substantially equal to the drive power for the creep motion of an automatic-transmission vehicle is outputted. This construction allows the driver to move the vehicle to a safe place. Therefore, even at the time of occurrence of an abnormality that makes the accelerator sensors entirely unusable, a certain safety regarding the vehicle is secured. Thus, even if both accelerator sensors become abnormal and it becomes impossible to input a request regarding drive power, the hybrid vehicle of the embodiment secures the highest-possible running performance, thereby improving safety at the time of an abnormality.

In the hybrid vehicle of the embodiment, the predetermined drive power corresponding to the creep motion can be realized by driving the second motor MG2 through the use of power from the battery 194 as mentioned above. Alternatively, the drive power may be realized by driving the engine 150 and operating the first motor MG1 for regeneration (causing the motor MG1 to output a reaction torque opposing the torque transferred from the engine) and thereby causing the torque directly transferred from the engine 150 to the motor MG2 to be outputted via the axle.

Next, an operation performed at the time of a shift position sensor abnormality will be described.

The shift position sensor 167 provided on the shift lever for detecting the position of the shift lever is made up of two systems of sensors, and supplies two shift position signals SP1, SP2 to the master control CPU 272. That is, like the circuit construction related to the processing of the accelerator sensor output signals illustrated in FIG. 4, the shift position sensor 167 is formed by two sensors 167a, 167b that have different characteristics. The output signals SP1, SP2 of the sensors 167a, 167b are inputted to the master control CPU 272. In the master control CPU 272, the abnormality detecting portion 272a detects occurrence of an abnormality regarding the shift position sensor 167, and supplies a result of detection to the control input determining portion 272b, as in the case of the accelerator sensor abnormality described above.

Figure 12:
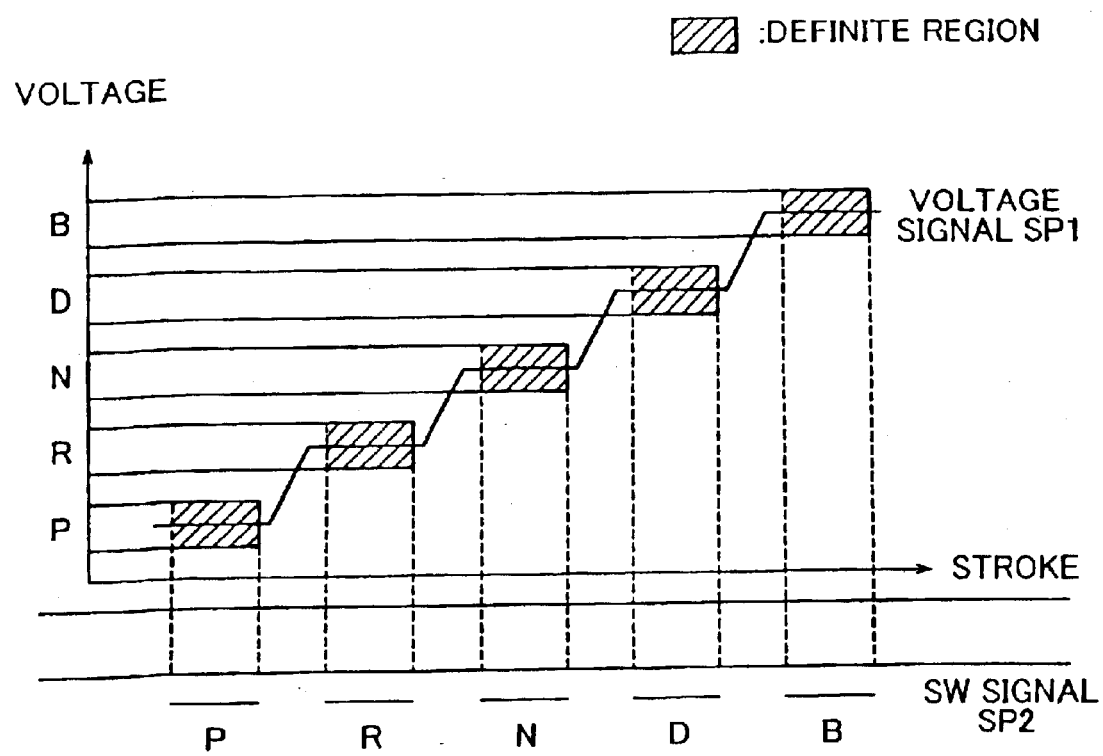
FIG. 12 is a diagram indicating the state of signals outputted from the shift position sensor 167.

FIG. 12 is a diagram indicating the state of signals outputted from the shift position sensor 167. Of the two sensor systems of the shift position sensor 167, the sensor 167a outputs a voltage signal (analog signal) corresponding to the position of the shift lever (shift position). In the hybrid vehicle of the embodiment, the shift positions determined by the position of the shift lever are the parking (P), the reverse (R), the neutral (N), the drive position (D), and the B position (B), which are arranged in that order. The B position (B) corresponds to a forward mode that is similar to the mode of the drive position (D) but that allows a stronger engine brake effect than the mode of the drive position.

The other sensor 167b is a sensor that outputs an on/off signal for checking which position the shift lever is presently set at. When the shift lever is at a position corresponding to one of the shift positions, the sensor 167b outputs an on signal corresponding to each shift position. When the shift lever is at an intermediate position between shift positions, the sensor 167a outputs an off signal. If any one of the on signals from the sensor 167b continues for a predetermined duration (e.g., 100 msec) and during that duration a voltage signal corresponding to the on signal is outputted from the sensor 167a, a shift position corresponding to the on signal and the voltage signal is determined. In FIG. 12, the horizontal axis represents the stroke of the shift lever, and the vertical axis represents the voltage value of the output signal of the sensor 167a. The on signal (SW signal) from the sensor 167b is indicated under the horizontal axis, at positions corresponding to the strokes at which the on signal is outputted.

Thus, in the shift position sensor 167, a shift position is determined based on the output signals from the two sensor systems 167a, 167b. The hybrid vehicle of the embodiment has a construction in which if one of the sensors has an abnormality and some of the shift positions become undeterminable, position determination is still performed with respect to the shift positions that are not affected by the abnormality. For example, if the sensor 167b has a partial break as an abnormality and the on signal for the P position is not outputted, the hybrid vehicle cannot determine the P position. In that case, however, the other shift positions can be determined provided that the on signals for the other shift positions can be correctly outputted and no contradiction is caused in predetermined arithmetic operations performed by the master control CPU 272 based on the sensor output signals.

If the voltage of the output signal from the sensor 167a is a value corresponding to a shift position whereas the sensor 167b does not output an on signal corresponding to the voltage signal, the abnormality detecting portion 272a determines that the sensor 167b has an abnormality, and changes the output characteristic in accordance with the abnormality, as indicated in FIG. 3. At this moment, the hybrid vehicle warns the driver that the shift position sensor has an abnormality and specific shift positions cannot be recognized, by producing a display, a voice/sound, vibrations, etc. as mentioned above.

At the time of a shift position sensor abnormality, the hybrid vehicle of the embodiment selects the same output characteristic as that set for normality (line (A) in FIG. 3), so that no substantial change in the output characteristic occurs. That is, the shift position sensor abnormality does not directly damage the drive power generating apparatus. Even though one or more of the on signals outputted by the sensor 167a become abnormal, the abnormality does not directly cause another abnormality. Therefore, in a control in this embodiment, the running performances at the correctly detectable shift positions are not reduced.

Thus, according to the hybrid vehicle of the embodiment, even if a shift position sensor abnormality occurs and some of the shift positions become undeterminable, the other shift positions can be determined normally and a sufficient running performance in accordance with the kind of the abnormality that has occurred is secured. Therefore, the hybrid vehicle allows a protective action to be taken while securing a vehicle safety. It is also practicable to adopt a construction in which if a shift position sensor abnormality occurs and some of the shift positions become undeterminable, a control of reducing the running performance by, for example, setting a maximum vehicle speed as in the above-described case of an accelerator sensor abnormality, is performed even when the vehicle runs in a running mode corresponding to any one of the normally determinable shift positions. This construction facilitates recognition of occurrence of an abnormality by the driver, and deters the driver from continuing to drive the vehicle with the present abnormality.

It is also preferable to adopt a construction in which if an abnormality of one of the shift position sensors is detected and shift position determination is allowed for the normally detectable shift positions so as to continue the running of the vehicle, the output restriction, after the abnormality detection, is gradually tightened so as to deter long term running of the vehicle with the present shift position sensor abnormality. For example, a maximum vehicle speed restriction may be provided after a predetermined time following detection of a shift position sensor abnormality or after a predetermined travel distance following the detection, and the maximum vehicle speed restriction may be tightened as time elapses following the abnormality detection or as the travel distance increases following the abnormality detection.

If the shift position sensor is formed by the sensor 167a that outputs the analog signal and the sensor 167b that outputs the on/off signal as in the hybrid vehicle of the embodiment, occurrence of an abnormality in the sensor that outputs the analog signal poses the following problem. That is, when the output from the sensor that outputs the on/off signal is off, it is impossible to determine whether the off-level output of the sensor is a result of the shift lever being at an intermediate position or the sensor having an abnormality. Therefore, in the hybrid vehicle of the embodiment, shift position determination based only on the sensor 167b that outputs the on/off signal is avoided if the sensor 167a that outputs the analog signal has an abnormality. Thus, if an abnormality that prevents shift position determination occurs, it is desirable to secure a best-possible running performance so as to allow a protective action while taking into account a danger of the present abnormality causing another abnormality, as in the above-described case where both accelerator sensors are abnormal. If the shift position sensor is formed by two sensors, each of which is capable of detecting the shift position alone as in the case of the above-described accelerator sensor, it is also practicable to use the sensor that is normal, at the time of occurrence of an abnormality in the other sensor, for performing shift position determination and to perform the output restriction for continuing the running of the vehicle.

Next, an operation performed at the time of a motor current sensor abnormality will be described.

The motor MG2 is mechanically connected to the axle, and is able to apply drive power directly to the axle, as described above. The motor MG2 is a three-phase synchronous motor in which predetermined magnetic fields are formed by supplying predetermined current through the three-phase coils provided on the individual stators, and the rotor is revolved due to interaction between the magnetic fields of permanent magnets of the rotor and the magnetic fields formed by the three-phase coils. As described above, the motor main control CPU 262 supplies the second motor control CPU 266 with a requested current value I2req in accordance with the requested torque value T2req regarding the motor MG2 supplied from the master control CPU 272. The second motor control CPU 266 controls the drive circuit 192 in accordance with the requested current value I2req, and supplies a predetermined current through the three-phase coils of the motor MG2, thereby driving the motor MG2. The drive circuit 192 is provided with a current sensor for measuring the value of current through the three-phase coils. The actually measured current value I2det measured by the sensor is supplied to the second motor control CPU 266 (see FIG. 2). The second motor control CPU 266 performs a control of feeding back the actually measured value of current that actually flows through the three-phase coils and correcting the amount of deviation between the value of current that actually flows and the value of current that needs to flow.

If an abnormality is detected in the current sensor provided in the drive circuit 192, the hybrid vehicle of the embodiment stops the control of correcting the value of current that needs to flow through the three-phase coils based on the value of current actually measured by the current sensor, and produces a predetermined alarm, as mentioned above, to the driver. The detection of an abnormality in the current sensor can be accomplished, for example, in a manner similar to that of the detection of an accelerator sensor abnormality described above. That is, signal patterns that do not occur if the sensor is normal are pre-stored in a ROM (not shown) provided for the second motor control CPU 266. If the output signal from the current sensor exhibits any one of the pre-stored abnormal patterns, it can be determined that the current sensor has an abnormality.

When an abnormality is detected in the current sensor in the above-described manner, it is impossible to perform the aforementioned control of feeding back the actually measured value of current through the three-phase coils of the motor MG2. Therefore, after an abnormality occurs in the current sensor, the drive circuit 192 is merely controlled in a one-way manner in accordance with the requested current value I2req, so that the running of the vehicle is simply continued if the value of current that actually flows deviates from the requested value of current.

The abnormality of the current sensor is not an abnormality that directly impairs the output of drive power from the drive power generating apparatus. Therefore, although it is possible to control the drive circuit 192 in accordance with the requested current value I2req calculated in the same manner as during normality even when the aforementioned control that does not feed back the value of current that actually flows, the embodiment restricts the output in comparison with the output during normality by performing a control of reducing the power extracted from the battery 194 to drive the motor MG2 from the normal level (e.g., to 80% of the normal level). At the time of an abnormality in the current sensor, it is practicable to restrict the output by setting a maximum vehicle speed as in the case of an accelerator sensor abnormality described above. However, since the current sensor abnormality is an abnormality that has only a small danger of causing another abnormality (although due to an impaired accuracy of the control of the motor MG2, there is a danger of a slight reduction in energy efficiency, a slight deterioration in the responsiveness to operations related to the running of the vehicle, etc., the current sensor abnormality is considered an abnormality that has only a small danger of causing another abnormality), the hybrid vehicle of the embodiment does not adopt such a maximum vehicle speed restriction, but performs an output restriction of curbing the output of power from the battery 194 to the motor MG2 so as to slightly reduce the accelerating performance. Furthermore, by reducing the power extracted from the battery 194 to drive the motor MG2 from the normal level, the hybrid vehicle of the embodiment considerably prevents supply of an undesired amount of current to the motor MG2 at the time of occurrence of an abnormality that impairs the accuracy of control of the motor MG2.

Therefore, according to the hybrid vehicle of the embodiment, even when an abnormality of the current sensor is detected, a sufficient running performance is secured in accordance with the kind of the abnormality that has occurred, so that a protective action can be taken. Furthermore, by slightly reducing the accelerating performance by curbing the amount of power outputted from the battery 194 to the motor MG2, the hybrid vehicle secures a sufficient safety in a situation where the precision of the drive signal to the motor MG2 is low.

The abnormality of the current sensor is an abnormality that has only a small danger of causing another abnormality, as mentioned above. Therefore, the hybrid vehicle of the embodiment does not perform the restriction based on the maximum vehicle speed, but performs the restriction of reducing the accelerating performance. However, it is also practicable to further perform output restriction stepwise in order to deter longer-than-necessary continuation of the running of the vehicle with an abnormality being present. For example, as in the foregoing embodiment, the maximum vehicle speed restriction may be set stepwise after the elapse of a predetermined time or the travel of a predetermined distance following detection of an abnormality of the current sensor.

Next, an operation performed at the time of a battery voltage signal abnormality will be described.

The circuit for supplying power from the battery 194 to the drive circuits 191, 192 is provided with a voltage sensor for detecting the output voltage value VB of the battery 194. The detected voltage value VB is supplied to the master control CPU 272 and the motor main control CPU 262 as mentioned above. The master control CPU 272 uses the output voltage value VB when determining quantities of control such as the revolution speeds of the engine 150 and the motors MG1, MG2, the torque distribution, etc. The motor main control CPU 262 uses the output voltage value VB when determining requested current values I1req, I2req to be supplied to the two motor control CPUs 264, 266, in accordance with the requested torque values T1req, T2req regarding the motors MG1, MG2 supplied from the master control CPU 272, respectively. The output voltage value VB thus supplied to the master control CPU 272 and the motor main control CPU 262 is used for controls of driving the motors MG1, MG2.

If an abnormality is detected in the signal of the voltage value VB of the battery 194, the hybrid vehicle of the embodiment stops the controls that use the voltage value detected by the aforementioned voltage sensor and produces an alarm mentioned above to the driver. The detection of a signal abnormality of the voltage value VB may be performed, for example, in substantially the same manner as in the above-described detection of an accelerator sensor abnormality. That is, signal patterns that usually do not occur if the sensor is normal are pre-stored in a ROM (not shown) provided for the master control CPU 272. If the signal regarding the output voltage value VB exhibits any one of the pre-stored abnormal patterns, it can be determined that an abnormality has occurred in the signal of the voltage value VB.

When a signal abnormality of the voltage value VB is detected, it is impossible for the master control CPU 272 and the motor main control CPU 262 to use the actually measured value regarding the output voltage of the battery 194 in determining quantities of control of the engine 150 and the motors MG1, MG2, as mentioned above. Therefore, upon detection of a signal abnormality of the voltage value VB, the master control CPU 272 calculates an estimated value of the output voltage of the battery 194, and uses the estimated value as a substitute for the actually measured value to determine the quantities of control, and supplies the estimated value to the motor main control CPU 262, so that the estimated value is used for determining requested current values I1req, I2req. Thus, the running of the vehicle is allowed to continue.

The estimated value of the output voltage of the battery 194 is determined based on an equation of electric energy balance regarding the hybrid vehicle. The amount of power outputted from the battery 194 and the amount of power consumed by various portions of the hybrid vehicle that are supplied with power from the battery 194 are equal, and hold equation (4) as follows:

$$\text{output current } (IB) \times \text{output voltage } (VB) = MG1 \text{ consumed power} + MG2 \text{ consumed power} + \text{power supply control circuit consumed power} \quad (4)$$

The portions supplied with power from the battery 194 are the motors MG1, MG2, and various circuits in the main ECU 210 that are supplied with reduced-voltage power via the electric power supply control circuit 274. The amounts of power consumed by the motors MG1, MG2 can be determined by multiplying the torques outputted from the motors MG1, MG2 by the revolution speeds of the motors MG1, MG2, respectively. In the actual calculation of the amounts of power consumed, the master control CPU 272 determines the amounts of power consumed as multiplication products of the requested torque values T1req, T2req regarding the motors MG1, MG2 supplied from the master control CPU 272 to the motor main control CPU 262 and the revolution speeds REV1, REV2 of the motors MG1, MG2 fed back from the revolution speed sensors of the motors MG1, MG2 via the motor main control CPU 262. The amount of power consumed by the electric power supply control circuit 274 can be calculated as a product of a value of voltage (12 V in the hybrid vehicle of the embodiment) predetermined as a value of voltage reduced by the electric power supply control circuit 274 and a value of current detected by a predetermined current sensor (not shown) provided in the electric power supply control circuit 274 for measuring the value of current supplied to various circuits after the voltage reduction.

The value of output current IB from the battery 194 is inputted to the master control CPU 272 as mentioned above. Although in FIG. 2, the output from the battery 194 to the electric power supply control circuit 274 is not indicated, the output current value IB detected by a predetermined current sensor is the value of total output current from the battery 194 including the power supplied to the electric power supply control circuit 274 as well as the power supplied to the drive circuits 191, 192. The master control CPU 272 calculates an estimated value of the output voltage value from the aforementioned values as in equation (4), and uses the estimated value of voltage to determine the quantities of motors MG1, MG2 and the like.

The aforementioned voltage sensor abnormality is not an abnormality that directly impairs the drive power outputting operations of the drive power generating apparatuses. Therefore, although it is possible to perform a control similar to that performed during normality without performing output restriction, the embodiment performs the control of reducing the power extracted from the battery 194 to drive the motor MG2 from the normal level so as to restrict the output in comparison with normality, as in the case of the above-described detection of a current sensor abnormality. At the time of a voltage sensor abnormality, it is practicable to restrict the output by setting a maximum vehicle speed as in the case of an accelerator sensor abnormality described above. However, since the voltage sensor abnormality is not an abnormality that directly causes another abnormality (although due to the lower precision of the estimated value in comparison with the actually measured value, the accuracy of the control of the motor MG2 is reduced and therefore there is a danger of a slight reduction in energy efficiency, a slight deterioration in the responsiveness to operations related to the running of the vehicle, etc., the voltage sensor abnormality is considered to have only a small danger of causing another abnormality), the hybrid vehicle of the embodiment does not adopt such a maximum vehicle speed restriction, but performs an output restriction of curbing the output of power from the battery 194 to the motor MG2 so as to slightly reduce the accelerating performance.

Therefore, according to the hybrid vehicle of the embodiment, even when an abnormality is detected in the voltage sensor, a sufficient running performance is secured in accordance with the kind of the abnormality that has occurred, so that a protective action can be taken. Furthermore, by slightly reducing the accelerating performance by curbing the amount of power outputted from the battery 194 to the motor MG2, the hybrid vehicle secures sufficient safety in a situation where the precision of the drive signal to the motor MG2 is low.

The abnormality of the voltage sensor is an abnormality that has only a small danger of causing another abnormality as mentioned above. Therefore, the hybrid vehicle of the embodiment does not perform the restriction based on the maximum vehicle speed, but performs the restriction of reducing the accelerating performance. However, it is also practicable to further perform output restriction stepwise in order to deter longer-than-necessary running of the vehicle with an abnormality being present. For example, as in the foregoing embodiment, the maximum vehicle speed restriction may be set stepwise after the elapse of a predetermined time or the travel of a predetermined distance following detection of an abnormality of the voltage sensor.

Next, an operation performed at the time of an engine system abnormality will be described.

In accordance with the hybrid vehicle of the embodiment, even if an abnormality occurs in the engine 150 or the engine ECU 240 so that drive power cannot be outputted from the engine 150, the running of the vehicle can be continued by driving the motor MG2 through the use of power stored in the battery 194. During the state in which drive power cannot be outputted from the engine 150, the running performance is restricted in a predetermined fashion in comparison with the normal running performance. Furthermore, if when the engine 150 has an abnormality the energy stored in the battery 194 is consumed at the time of occurrence of another abnormality, it becomes impossible to run the vehicle. Therefore, in accordance with the hybrid vehicle of the embodiment, if the engine 150 has an abnormality and the running of the vehicle is continued using the battery 194 as a sole energy source, the following operation is performed. That is, while the remaining charge (SOC) of the battery 194 is high, a certain running performance in accordance with an acceleration request from the driver is secured to allow a necessary protective action. After the remaining charge in the battery 194 has been reduced to or below a predetermined amount, the output restriction (vehicle speed restriction) is performed in order to secure a longest-possible running range.

Occurrence of an abnormality in the engine 150 is detected by the engine ECU 240 based on patterns of detection signals inputted from various sensors provided in the engine 150. If an abnormality occurs, the engine ECU 240 outputs an abnormality detection signal to the master control CPU 272 so as to notify occurrence of an abnormality, and stops the operation of the engine 150.

Figure 13:
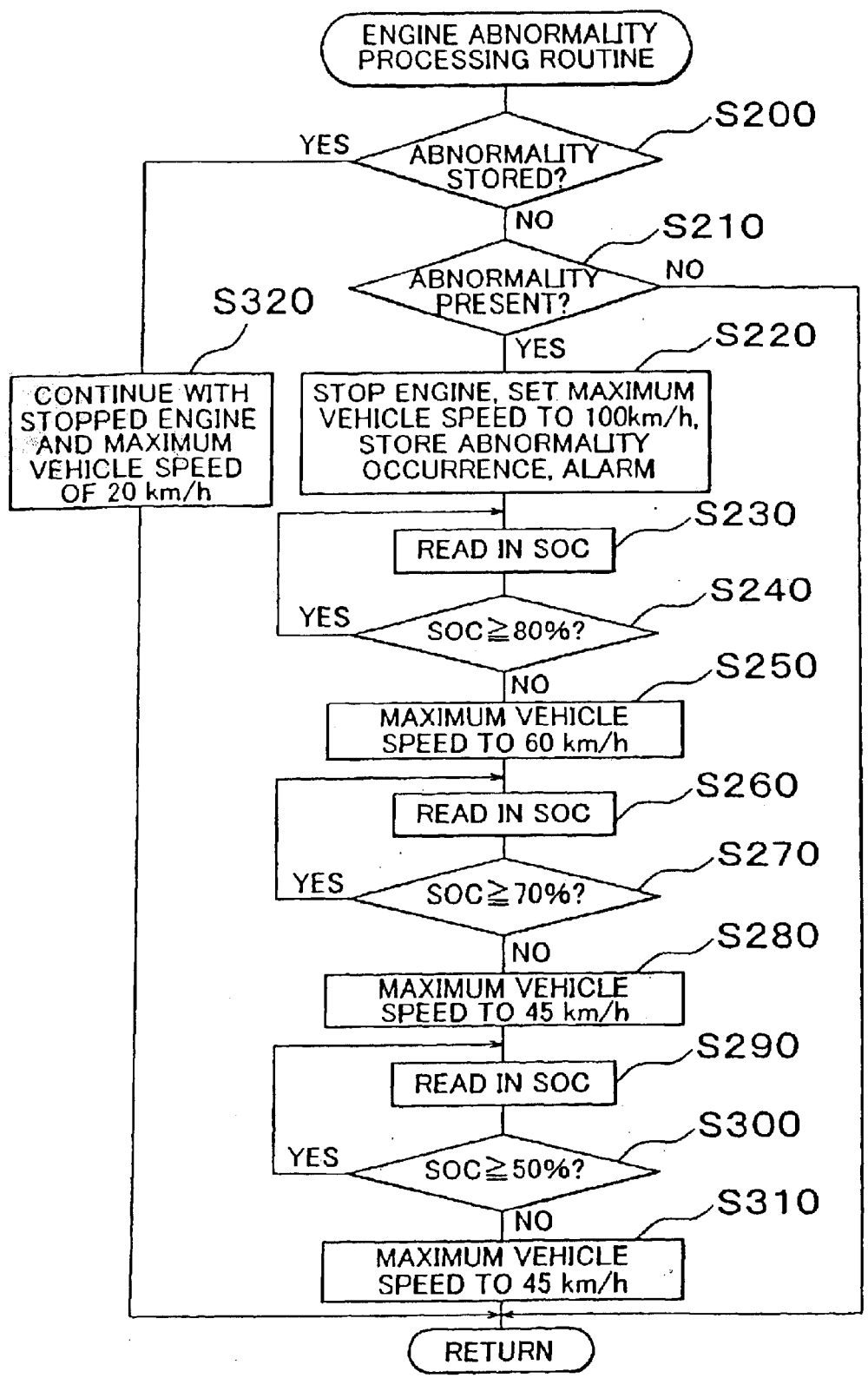
FIG. 13 is a flowchart illustrating an engine abnormality processing routine.

FIG. 13 is a flowchart illustrating an engine abnormality processing routine. This routine is executed at every predetermined time by the master control CPU 272. When the routine is executed, the master control CPU 272 first refers to the EEPROM 282 provided in the abnormality history registering circuit 280 (FIG. 4), and determines whether there is a history regarding occurrence of abnormalities (step S200). If an abnormality of the engine 150 is detected, information regarding the abnormality occurrence is registered in the EEPROM 282 provided in the abnormality history registering circuit 280 (FIG. 4), as described below. Therefore, by referring to the EEPROM 282 in the abnormality history registering circuit 280, the master control CPU 272 can recognize whether an abnormality has already occurred in the engine 150. Alternatively, it is practicable to store occurrence of an abnormality in a ROM (not shown) provided for the master control CPU 272 separately from the EEPROM 282 of the abnormality history registering circuit 280, and to refer to the ROM.

If occurrence of an abnormality is not stored in the EEPROM 282 of the abnormality history registering circuit 280, the master control CPU 272 determines whether the engine 150 has an abnormality based on the presence or absence of input of an abnormality detection signal from the engine ECU 240 (step S210). If an abnormality of the engine 150 is detected in step S210, the master control CPU 272 switches the control so as to avoid the use of the engine 150 and use only the power outputted from the motor MG2 as drive power of the vehicle, and sets the maximum vehicle speed to 100 km/h. Furthermore, the master control CPU 272 stores occurrence of an abnormality in the engine 150 into the EEPROM 282 of the abnormality history registering circuit 280, and outputs an alarm as mentioned above, such as a display, a sound/voice, artificially generated vibrations, etc., in order to inform the driver of the occurrence of the abnormality (the aforementioned operations performed in step S220).

When the engine 150 is stopped and the vehicle is driven only by drive power from the motor MG2, a requested value of torque to be outputted via the axle is determined based on the then vehicle speed and the degree of accelerator operation, as in the case of normal operation. However, when the control of stopping the engine 150 is performed, a control of outputting the entire requested torque value from the second motor MG2 is performed instead of determining quantities of control, such as revolution speeds of the engine 150 and the motors MG1, MG2 and torque distribution or the like, and supplying various requested values to various CPUs and ECUs. When a desired amount of drive power is generated by using the motor MG2, drive power can be outputted within the capacity of the motor MG2. However, in the hybrid vehicle of the embodiment, the maximum vehicle speed at the time of a stop of the engine 150 is limited to 100 km/h, due to mechanical limitations of the sun gear 121 of the planetary gear described above. The vehicle speed restriction based on the mechanical limitations of the sun gear 121 will be described in detail below. With the maximum vehicle speed set as described above, acceleration of the vehicle is prohibited after the vehicle speed has reached the maximum vehicle speed. That is, after the vehicle speed reaches the maximum vehicle speed, torque output from the motor MG2 is prohibited regardless of the degree of accelerator operation.

After that, the master control CPU 272 reads in the remaining charge (SOC) of the battery 194 (step S230). The SOC of the battery 194 is calculated by the abnormality history registering circuit 280 totaling the amounts of power outputted from and inputted to the battery 194 over time. The SOC value determined through the totaling operation is inputted from the battery ECU 230 into the master control CPU 272.

After reading in the remaining charge of the battery 194, the master control CPU 272 determines whether the remaining charge is at least 80% (step S240). If the remaining charge is at least 80%, the master control CPU 272 continues the control with the maximum vehicle speed set to 100 km/h while repeating the processing of step S230 and step S240 until the remaining charge becomes less than 80%. After it is determined in step S240 that the remaining charge is less than 80%, the master control CPU 272 changes the maximum vehicle speed setting to 60 km/h (step S250).

Subsequently, the master control CPU 272 reads in the remaining charge of the battery 194 again (step S260), and determines whether the remaining charge is at least 70% (step S270). If the remaining charge is at least 70%, the master control CPU 272 continues the control with the maximum vehicle speed set to 60 km/h while repeating the processing of steps S260 and S270 until the remaining charge becomes less than 70%. After it is determined in step S270 that the remaining charge is less than 70%, the master control CPU 272 changes the maximum vehicle speed setting to 45 km/h (step S280).

Subsequently, the master control CPU 272 reads in the remaining charge of the battery 194 again (step S290), and determines whether the remaining charge is at least 50% (step S300). If the remaining charge is at least 50%, the master control CPU 272 continues the control with the maximum vehicle speed set to 45 km/h while repeating the processing of steps S290 and S300 until the remaining charge becomes less than 50%. After it is determined in step S300 that the remaining charge is less than 50%, the master control CPU 272 changes the maximum vehicle speed setting to 20 km/h (step S310). After that, the master control CPU 272 ends this routine.

If an abnormality of the battery 194 is not detected in step S210 of this routine, the master control CPU 272 immediately ends this routine. If it is determined in step S200 that an abnormality of the battery 194 is stored, the master control CPU 272 continues the control of acquiring drive power from the motor MG2 while maintaining the stop of the engine, and also continues the control with the maximum vehicle speed set to 20 km/h (step S320). After that, the master control CPU 272 ends this routine.

The aforementioned mechanical limitations of the sun gear 121 will be described. The planetary gear 120 having three rotating shafts, that is, the planetary carrier shaft 127, the sun gear shaft 125 and the ring gear shaft 126, has a characteristic that if rotation speeds of two of the three rotating shafts and a torque of one of the three rotating shafts (hereinafter, the rotation speed and the torque of a rotating shaft will be collectively referred to as "rotation state") are given, the rotation states of all the rotating shafts are determined. The relationship among the rotation speeds of the three rotating shafts is expressed in equation (1), and the relationship among the torques of the three rotating shafts is expressed in equations (2) and (3). Thus, the relationships among the rotation states of the rotating shafts can be determined by mathematical expressions that are well known in mechanics. The relationships among the rotation states of the rotating shafts can also be geometrically determined from a diagram termed "alignment chart".

Figure 14:
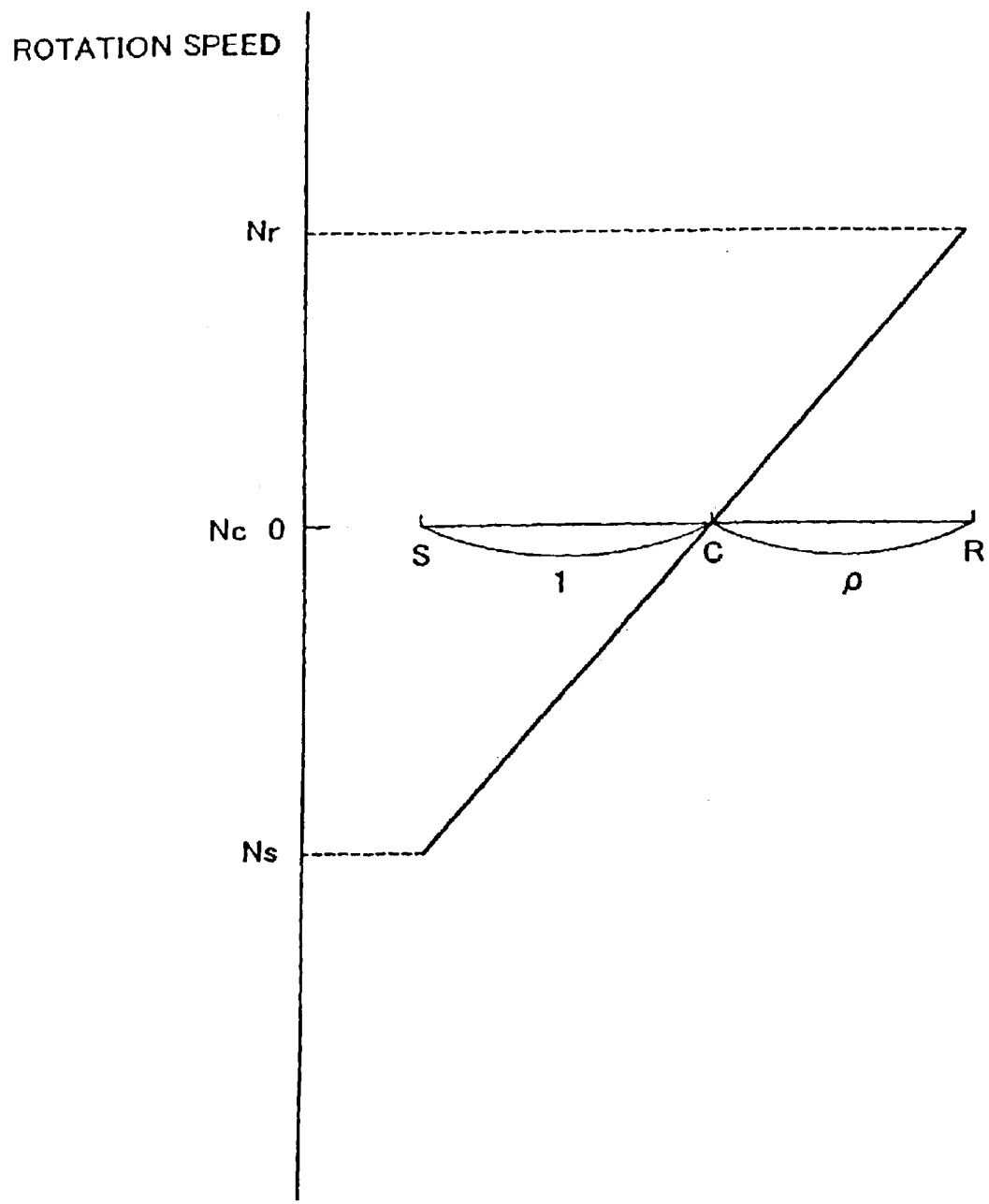
FIG. 14 is an alignment chart for illustrating the operation principle of a drive power generating apparatus in the embodiment.

FIG. 14 shows an alignment chart in which the vertical axis represents the rotation speed of each rotating shaft and the horizontal axis represents the gear ratios among the gears in a distance relationship. The sun gear shaft 125 (S in FIG. 14) and the ring gear shaft 126 (R in FIG. 14) are plotted at opposite ends, and the position of the planetary carrier shaft 127 is defined at a position C that internally divides the distance between the position S and the position R at a ratio of 1:$\rho$. As mentioned above, $\rho$ is the ratio of the number of teeth of the sun gear 121 to the number of teeth of the ring gear 122. With respect the positions S, C, R on the horizontal axis, the rotation speeds Ns, Nc, Nr of the gears are plotted. The planetary gear 120 has a characteristic that the thus-plotted three points of the revolution speeds always align on a straight line. This straight line is termed "operating common line". Since a single straight line is determined if two points are given, the use of such an operating common line makes it possible to determine the rotation speed of one of the three rotating shafts from given rotation speeds of the other two rotating shafts. As described above, the crankshaft 156 of the engine 150 is connected to the planetary carrier shaft 127, and the rotor 132 of the motor MG1 is connected to the sun gear shaft 125, and the rotor 142 of the motor MG2 is connected to the ring gear shaft 126 mechanically connected to the axle, so that the rotation speeds of the rotating shafts correspond to the revolution speeds of the engine 150, the motor MG1 and the motor MG2, respectively.

The alignment chart of FIG. 14 corresponds to a state in which the engine 150 is stopped and the vehicle is run by driving the motor MG2. When the engine 150 is stopped, the rotation speed (Nc) of the planetary carrier shaft 127 becomes "0". In that case, the ring gear shaft 126 connected to the motor MG2, which outputs a predetermined amount of drive power, rotates at a rotation speed (Nr) corresponding to the vehicle speed. The sun gear shaft 125 connected to the motor MG1, which does not output torque, rotates at a rotation speed (Ns) that is determined by the rotation speeds of the aforementioned two rotating shafts. Thus, when the engine 150 is stopped and the rotation speed of the planetary carrier shaft 127 is "0", increases in the vehicle speed, that is, increases in the rotation speed of the motor MG2 (i.e., increases in the rotation speed Nr of the ring gear shaft 126) increase the rotation speed Ns of the sun gear shaft 125. Each of the gears forming the planetary gear 120 has an upper limit of rotation speed due to a matter of mechanical strength. In a state where the hybrid vehicle of the embodiment is run by driving the motor MG2 while keeping the engine 150 in a stopped state, the rotation speed Ns of the sun gear shaft 125 reaches the mechanical limit of the sun gear shaft 125 before the revolution speed of the motor MG2 driving the vehicle reaches the capacity limit of the motor MG2. While the engine 150 is stopped, the vehicle speed corresponding to a limit value of the rotation speed Nr of the ring gear shaft 126 that is set so that the rotation speed Ns of the sun gear shaft 125 does not exceed its limit is 100 km/h in the hybrid vehicle of the embodiment. In step S220 of the engine abnormality processing routine in FIG. 13, the maximum vehicle speed is set to 100 km/h when the control is changed so as to stop the engine 150.

According to the hybrid vehicle of the embodiment constructed as described above, if an abnormality occurs in the engine 150, the running of the vehicle is continued by using the motor MG2 while setting a maximum vehicle speed corresponding to the limit imposed by the aforementioned gear mechanical strength. Therefore, even if an abnormality is detected in the engine 150, a sufficient running performance is secured in accordance with the kind of abnormality that has occurred, so that a protective action can be taken. That is, the hybrid vehicle of the embodiment makes it possible to take a sufficient protective action at the time of occurrence of an abnormality even during high-speed running, and improve the safety of the vehicle by the above-described maximum vehicle speed setting.

Furthermore, at the time of an abnormality of the engine 150, the vehicle is allowed to run only within the range determined by the amount of energy stored in the battery 194, as mentioned above. Therefore, at the time of an engine abnormality, the hybrid vehicle of the embodiment performs output restriction (tightens the maximum vehicle speed setting) in accordance with decreases in the remaining charge of the battery 194 so as to secure a possible travel distance for a protective action. When an abnormality occurs, the hybrid vehicle secures a certain running performance, thereby securing a safety in taking a protective action during high-speed running. After that, the running performance is gradually limited so as to prompt the driver to take a necessary measure for the present abnormality as soon as possible and secure a possible travel distance for moving to a safe place. By eventually setting the maximum vehicle speed to 20 km/h, a performance or capability for moving the vehicle is secured as long as available energy remains in the battery 194. Thus, since the abnormality regarding the engine 150 is an abnormality that eventually leads to immobility of the vehicle (when the remaining charge of the battery 194 becomes null), the embodiment secures a sufficient running performance immediately after occurrence of an abnormality, and subsequently reduces the running performance stepwise to sufficiently reduce the running performance as indicated by the operation characteristic line (D) in FIG. 3, and secures a longest-possible travel distance for moving to a safe place.

In the engine abnormality processing routine illustrated in FIG. 13, the maximum vehicle speed is set to a value (60 km/h, 45 km/h, 20 km/h, etc.) based on the determination as to whether the remaining charge (SOC) of the battery 194 has decreased to a predetermined value (80%, 70%, 50%, etc.). The SOC value serving as a reference and the maximum vehicle speed setting are not limited to the values indicated in FIG. 13, but may be suitably set to various values in various steps in accordance with the running performance that is allowed for the vehicle. By gradually tightening the maximum vehicle speed restriction with decreases in the remaining charge, the aforementioned predetermined advantages can be achieved.

Furthermore, according to the foregoing embodiment, when an abnormality of the engine 150 is detected, the maximum vehicle speed is set based on the limitation imposed by the mechanical strength of the sun gear 121. However, it is also practicable to set a vehicle speed that is lower than a vehicle speed determined by the limitation imposed by the mechanical strength as a maximum vehicle speed at the time of occurrence of an abnormality. If the gear capacity and the motor capacity are sufficient and the vehicle can run at high speed, the maximum vehicle speed may be set in accordance with the vehicle speed detected at the time of occurrence of an engine abnormality, as in the case of an accelerator sensor abnormality. Therefore, at the time of occurrence of an abnormality, a running performance for taking a protective action can be secured, and undesired energy consumption can be substantially avoided.

In the foregoing embodiment, the output restriction (restriction of the maximum vehicle speed) is set tighter stepwise. The stepwise tightening of the output restriction may be performed by taking into consideration the elapse of time or the travel distance following occurrence of an engine abnormality, as in the case of an accelerator sensor abnormality or the like described above.

Furthermore, according to the foregoing embodiment, if an abnormality is detected, the maximum vehicle speed is set to 100 km/h regardless of the vehicle speed at the time of the abnormality detection. However, it is also practicable to set the maximum vehicle speed in accordance with the vehicle speed at the time of occurrence of an abnormality. This construction also secures a sufficient running performance at the time of occurrence of an abnormality, thereby allowing a safer protective action to be taken.

While the operations performed at the times of occurrence of various abnormalities have been described, occurrence of other various abnormalities are conceivable in the hybrid vehicle of the embodiment. For example, occurrence of an abnormality in a sensor other than the aforementioned sensors, occurrence of an abnormality in an ECU of the hybrid vehicle, occurrence of an abnormality to communications between ECUs and/or CPUs, occurrence of an abnormality in the battery 194 or a motor, etc., are possible. Application of the invention makes it possible to secure an output that allows a protective action in accordance with the kind of abnormality. If an abnormality that has occurred is an abnormality that does not directly impair the operation of the drive power generating apparatus, the safe running of the vehicle can be secured by restricting the output through the maximum vehicle speed setting in accordance with the kind of abnormality that has occurred. Furthermore, if an abnormality that has occurred is an abnormality that directly affects the operation of the drive power generating apparatus, the control is changed to a control that does not use a portion having the abnormality. If this change of the control involves a reduction in the output from the normal level, the output reduction resulting from the change of the control secures safe running of the vehicle. Furthermore, by using remaining normal functions, a best-possible running performance for a protective action is secured. After the control is changed at the time of occurrence of an abnormality and the running performance is reduced in accordance with the kind of the abnormality, the further stepwise reductions in the running performance will deter longer-than-necessary continuation of the running of the vehicle with the abnormality being present, thereby improving safety. If the output is restricted at the time of occurrence of an abnormality, it is preferable that the state of running of the vehicle be taken into consideration for suitable output restriction. For example, immediately after an abnormality occurs, the safety in taking a protective action during high-speed running can be improved by securing a running performance that exceeds the output restriction that is usually to be set.

While the present invention has been described with reference to what are presently considered to be preferred embodiments thereof, it is to be understood that the invention is not limited to the disclosed embodiments or constructions. To the contrary, the invention can be embodied in various manners within a range that does not depart from the gist of the invention.

What is claimed is:

1. An operation control apparatus installed in a vehicle for controlling a state of running of the vehicle, comprising:
   a drive power generating apparatus;
   a detector that detects a state regarding an operation of the vehicle; and
   a controller configured and adapted to control the drive power generating apparatus in a first mode of operation and in a second mode of operation, wherein in the first mode of operation the controller changes a drive power produced by the drive power generating apparatus in accordance with a drive power increasing request from a driver, and wherein upon detection of an abnormality in the detector, the controller controls the drive power generating apparatus in the second mode in correspondence with a content of the detected abnormality.

2. An operation control apparatus according to claim, wherein the controller stores a plurality of predetermined during-abnormality control modes including the second mode.

3. An operation control apparatus according to claim 1, wherein, in the second mode, the controller restricts a change in drive power in accordance with a drive power increasing request, in comparison with a change in drive power in accordance with a drive power increasing request when the abnormality is not detected.

4. An operation control apparatus according to claim 1, wherein, in the second mode, the controller prohibits the vehicle from accelerating regardless of a drive power increasing request after a speed of the vehicle reaches a specific speed.

5. An operation control apparatus according to claim 4, wherein, in the second mode, the controller allows a drive power corresponding to a drive power increasing request to be generated until the speed of the vehicle reaches a specific speed, provided that a speed of the vehicle when the abnormality is detected is at least a predetermined speed.

6. An operation control apparatus according to claim 5, wherein, in the second mode, the controller allows a drive power corresponding to the drive power increasing request to be generated until the speed of the vehicle exceeds the specific speed of the vehicle, provided that at least one of certain conditions is met, the certain conditions including a condition that an elapsed time following detection of the abnormality is less than a predetermined time, and a condition that a travel distance following detection of the abnormality is less than a predetermined distance.

7. An operation control apparatus according to claim 1, wherein, in the second mode, the controller controls the drive power generating apparatus to generate drive power by using a portion thereof capable of functioning normally when the abnormality occurs, and the controller changes the drive power in accordance with the drive power increasing request.

8. An operation control apparatus according to claim 1, wherein, in the second mode, the controller restricts the drive power of the vehicle in a stepwise fashion based on at least one of an elapsed time following detection of the abnormality and a travel distance following detection of the abnormality.

9. An operation control apparatus according to claim 1, wherein:
   a plurality of detectors are provided and the detectors detect a specific quantity of displacement regarding the vehicle,
   wherein the abnormality is an abnormality that occurs in at least one of the detectors, such that an abnormality occurring in at least another one of the detectors renders it impossible to detect the specific quantity of displacement.

10. An operation control apparatus according to claim 1, wherein, in the second mode, the controller causes the drive power generating apparatus to output a small drive power that allows the vehicle to be moved via the drive power generating apparatus regardless of a drive power increasing request.

11. An operation control apparatus according to claim 1, wherein, in the second mode, the controller controls the drive power generating apparatus in correspondence with a content of the detected abnormality and a torque request from the driver.

12. An operation control apparatus according to claim 1, wherein, the detector is an accelerator sensor which detects a degree of accelerator pedal depression.

13. An operation control apparatus according to claim 1, wherein the detector is a shift position sensor which detects a position of a shift lever of the vehicle.

14. An operation control apparatus according to claim 1, wherein, the drive power generating apparatus includes a motor, and the detector is a sensor which detects an amount of current supplied to the motor.

15. An operation control apparatus according to claim 1, wherein, the drive power generating apparatus includes a motor and a battery supplying an electric power to the motor, and the detector is a sensor which detects an output voltage value of the battery.

16. A vehicle comprising an operation control apparatus for controlling a state of running of the vehicle, comprising:
   a drive power generating apparatus;
   a detector which detects a state regarding an operation of the vehicle; and
   a controller configured and adapted to control the drive power generating apparatus in a first mode of operation and in a second mode of operation, wherein in the first mode of operation the controller changes a drive power produced by the drive power generating apparatus in accordance with a drive power increasing request from a driver, and wherein upon detection of an abnormality in the detector, the controller controls the drive power generating apparatus in the second mode in correspondence with a content of the detected abnormality.

17. An operation control apparatus according to claim 16, wherein, in the second mode, the controller controls the drive power generating apparatus in correspondence with a content of the detected abnormality and a torque request from the driver.

18. An operation control apparatus installed in a vehicle for controlling a state of running of the vehicle, comprising:

a drive power generating apparatus;

a controller adapted to perform a control for driving the drive power generating apparatus;

a detector which detects a state regarding an operation of the vehicle; and an abnormality detector positioned and adapted to detect an abnormality in the detector, wherein the controller restricts the drive power of the vehicle in a stepwise fashion when the abnormality detector detects the abnormality in the detector.

19. An operation control apparatus according to claim 18, wherein a plurality of detectors are provided, and the detectors detect a specific quantity of a displacement regarding the vehicle, wherein the abnormality is an abnormality that occurs in at least one of the detectors, such that an abnormality occurring in at least another one of the detectors renders it impossible to detect the specific quantity of displacement.

20. An operation control apparatus according to claim 18, wherein the controller restricts the drive power based on at least one of an elapsed time following detection of the abnormality and a travel distance following detection of the abnormality.

21. A vehicle having an operation control apparatus for controlling a state of running of the vehicle, comprising:

a drive power generating apparatus;

a controller adapted to perform a control for driving the drive power generating apparatus;

a detector which detects a state regarding an operation of the vehicle; and an abnormality detector positioned and adapted to detect an abnormality in the detector, wherein the controller restricts the drive power of the vehicle in a stepwise fashion when the abnormality detector detects the abnormality in the detector.

22. An operation control method for controlling a state of running of a vehicle, the vehicle using a drive power generating apparatus for generating a drive power, the method comprising the steps of:

detecting a drive power increasing request for an increase in the drive power of the vehicle;

controlling the drive power generating apparatus so as to change the drive power in accordance with the drive power increasing request;

detecting a state regarding an operation of the vehicle, by a detector; and changing, upon detecting an abnormality in the detector, a content of control with respect to the drive power generating apparatus in accordance with a content of the abnormality detected.

* * * * *